US012234842B2

(12) United States Patent
Cassaidy et al.

(10) Patent No.: US 12,234,842 B2
(45) Date of Patent: Feb. 25, 2025

(54) PRESSURE CONTROL VALVE WITH REDUCED PILOT FLOW AND HYDRAULIC CONTROL SYSTEM WITH THE SAME

(71) Applicant: HydraForce, Inc., Lincolnshire, IL (US)

(72) Inventors: Kevin Cassaidy, Mt. Prospect, IL (US); Joel Mekkes, Traverse City, MI (US); Matthew Meyer, Lincolnshire, IL (US)

(73) Assignee: HydraForce, Inc., Lincolnshire, IL (US)

( * ) Notice: Subject to any disclaimer, the term of this patent is extended or adjusted under 35 U.S.C. 154(b) by 0 days.

(21) Appl. No.: 18/050,856

(22) Filed: Oct. 28, 2022

(65) Prior Publication Data
US 2023/0146852 A1    May 11, 2023

Related U.S. Application Data

(60) Provisional application No. 63/273,629, filed on Oct. 29, 2021.

(51) Int. Cl.
*F15B 13/04* (2006.01)
*F16K 11/07* (2006.01)

(52) U.S. Cl.
CPC ...... *F15B 13/0402* (2013.01); *F16K 11/0716* (2013.01); *F15B 2211/329* (2013.01); *F15B 2211/428* (2013.01)

(58) Field of Classification Search
CPC ............ F15B 13/0402; G05D 16/2097; G05D 16/2024; F16K 11/0716; Y10T 137/8671; Y10T 137/86702
See application file for complete search history.

(56) References Cited

U.S. PATENT DOCUMENTS

| | | | |
|---|---|---|---|
| 9,915,276 B2 | 3/2018 | Bruck et al. | |
| 2006/0054225 A1* | 3/2006 | Hillesheim | G05D 16/2097 137/625.64 |
| 2007/0163662 A1 | 7/2007 | Reilly et al. | |
| 2021/0089061 A1* | 3/2021 | Bill | G05D 16/101 |

OTHER PUBLICATIONS

European Patent Office, International Search Report and Written Opinion of the International Searching Authority in International Patent Application No. PCT/US2022/078937 (Jan. 26, 2023).

* cited by examiner

*Primary Examiner* — Kelsey E Cary
(74) *Attorney, Agent, or Firm* — Leydig, Voit & Mayer, Ltd.

(57) ABSTRACT

A hydraulic valve comprises a proportional piloted valve that controls pressure and includes means for restricting pilot flow through the pilot flow passage. The means for restricting pilot flow defines a restriction in the pilot flow passage when a movable spool disposed in an axial bore of the body of the valve is in a neutral position. The restriction varies as a function of spool movement such that flow of hydraulic fluid through the pilot flow passage is variably restricted as a function of the position of the spool over its range of travel.

30 Claims, 9 Drawing Sheets

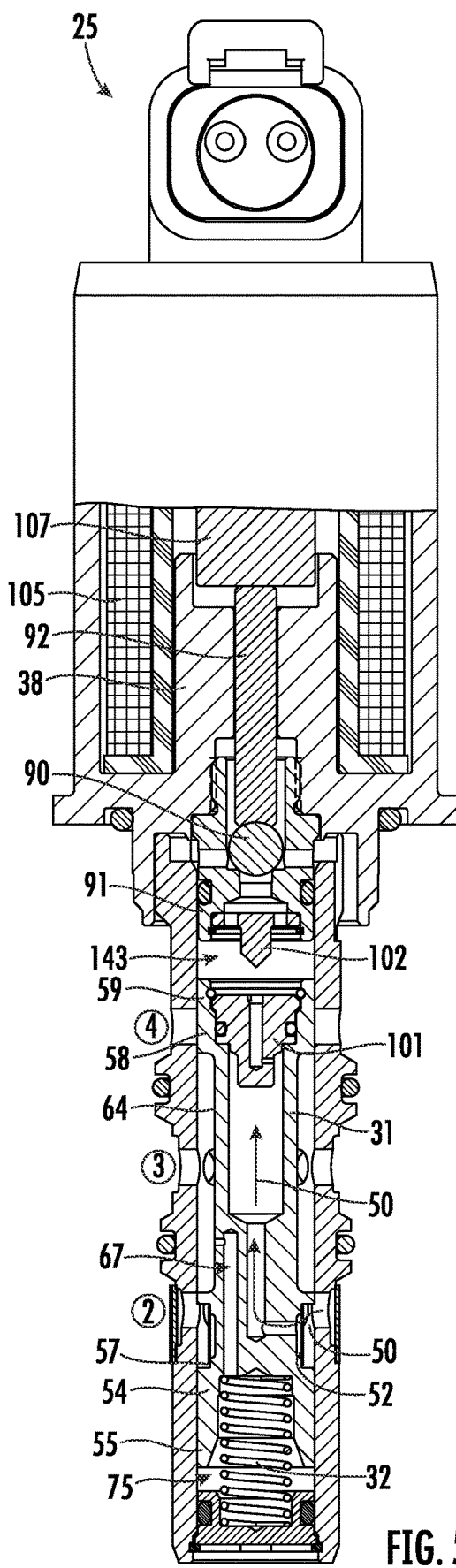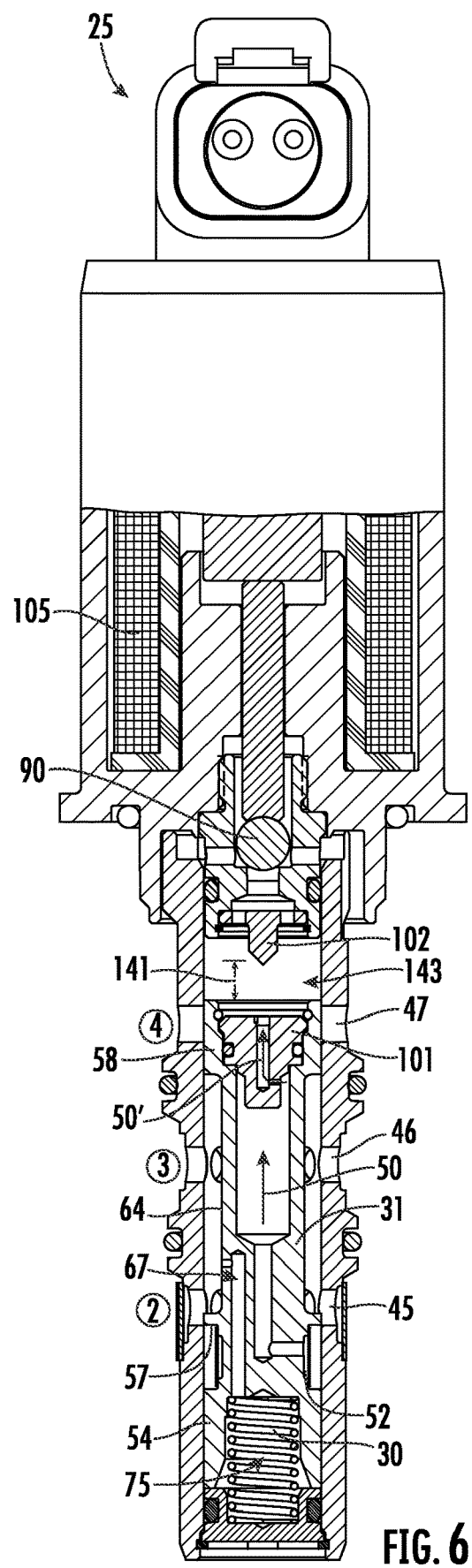

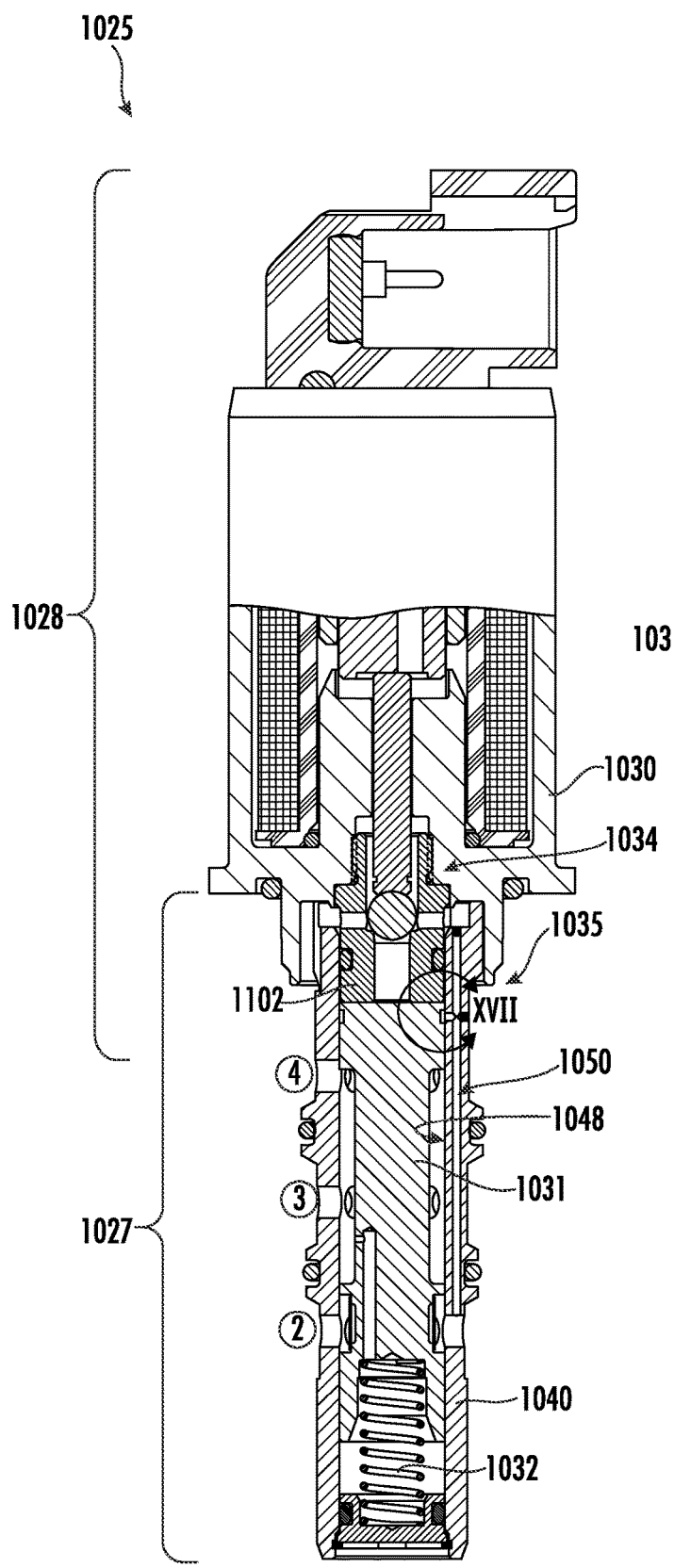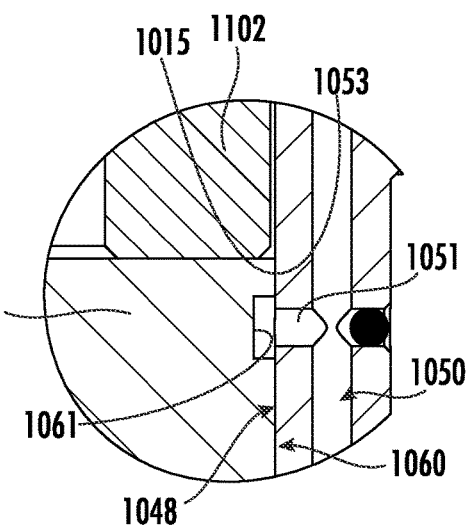
FIG. 17
FIG. 16

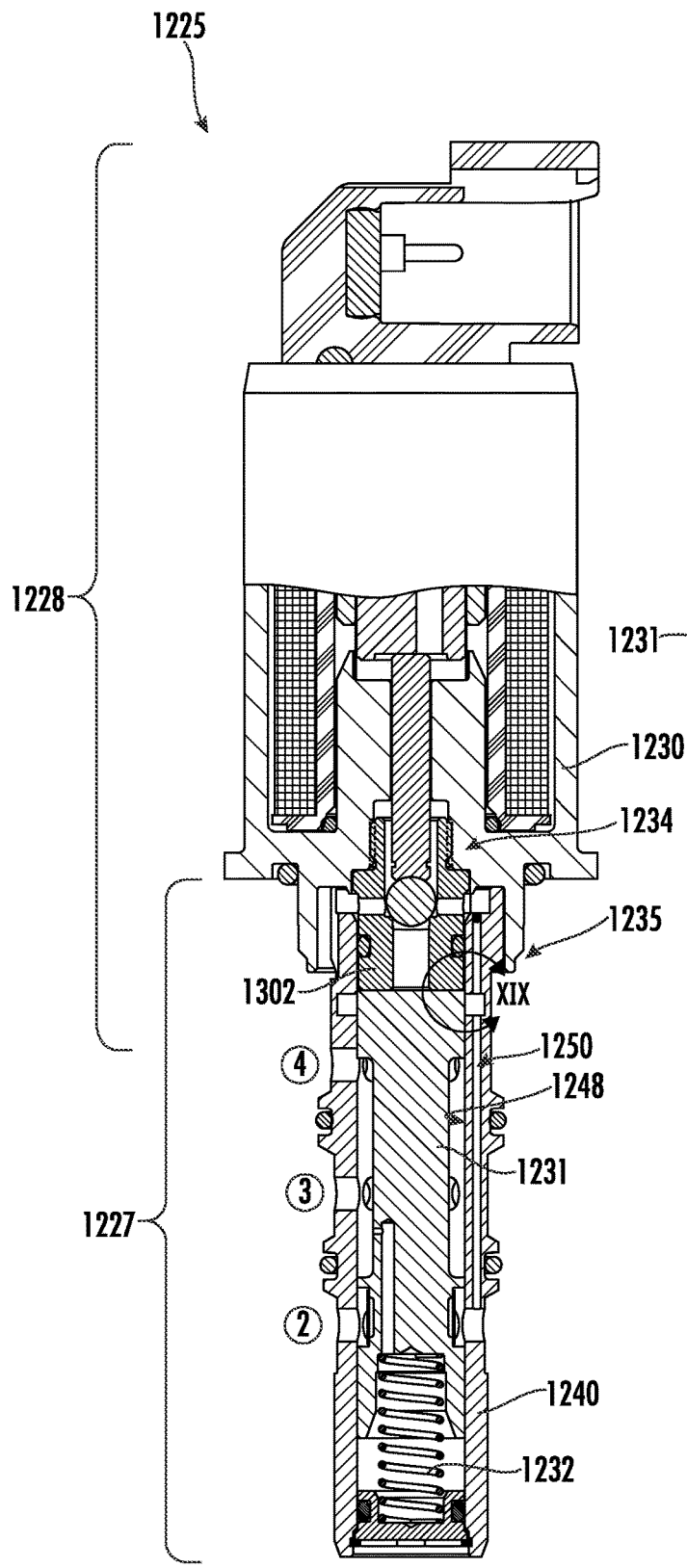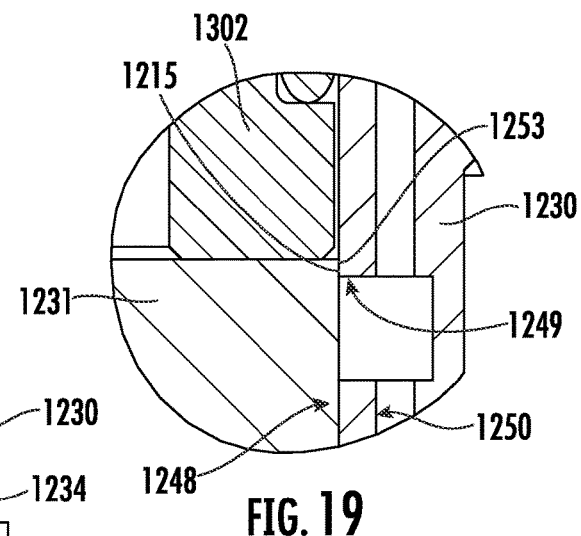
FIG. 19
FIG. 18

PRESSURE CONTROL VALVE WITH REDUCED PILOT FLOW AND HYDRAULIC CONTROL SYSTEM WITH THE SAME

CROSS-REFERENCE TO RELATED APPLICATIONS

This patent application claims the benefit of priority to U.S. Provisional Patent Application No. 63/273,629, filed Oct. 29, 2021, and entitled, "Pressure Control Valve with Reduced Pilot Flow and Hydraulic Control System with the Same," which is incorporated in its entirety herein by this reference.

TECHNICAL FIELD

This patent disclosure relates generally to a hydraulic valve and, more particularly, to a hydraulic cartridge valve comprising a pilot-operated proportional pressure control valve that uses a leakage control element in the pilot stage to reduce the pilot flow between a supply pressure port and a tank port when the valve is in a neutral position.

BACKGROUND

Mobile machines, such as, e.g., excavators and backhoe loaders, typically include pilot-operated proportional pressure control valves in a hydraulic circuit configured for selective actuation of transmission clutches. One problem associated with such valves is the high pilot oil flow between the supply pressure port to the tank port when the valve is in the neutral position (i.e., with no current applied to the coil). The pilot flow, also known as leakage, is a function of supply pressure in which the higher the supply pressure the higher the leakage. In many applications with a supply pressure of 30 bar applied to the supply pressure port, the pilot flow can exceed one liter per minute in the neutral position. This unused pilot oil results in energy loss. In many transmission applications, there are typically more than one such valve used in the hydraulic circuit which significantly increases the amount of unused oil.

One solution to reduce the pilot flow leakage is to decrease the size of the pilot stage orifice. The downside to this approach is the response time of the valve is negatively affected, thereby causing the main spool to shift much slower when moving between the supply pressure port and the work port. The smaller orifice sizes can be difficult to machine, thereby increasing their cost and/or rendering them impractical to manufacture, and are also more prone to blockage from contamination in the system.

Typical two stage pressure control valves can be sensitive to contamination. This type of valve uses pilot flow to control the main stage spool. Over time, the filters used to protect the valve from contamination break down and are ineffective in preventing large particles into these orifices. If theses orifices or passages are exposed to contamination, then the particles may not pass through and eventually block the orifice. A blocked orifice is a common failure mode in a hydraulic system.

U.S. Pat. No. 9,915,276 discloses an example of a valve available on the market which uses a leakage reducing valve integrated into the pilot stage to control the leakage. This secondary valve is essentially a miniature spool valve that is moved between an open and closed position by actuating the solenoid coil. When the coil is de-energized, the leakage reducing valve returns to the closed position by use of a secondary spring to restrict the pilot flow. When the coil is actuated, the reducing valve spool moves to the open position. This is a costly and complex solution to reduce the pilot flow leakage.

There is a continued need in the art to provide additional solutions to enhance the use and efficiency of hydraulic circuits over a range of conditions. For example, there is a continued need for a hydraulic cartridge valve, specifically a pilot-operated proportional pressure control valve that operates with reduced pilot flow between the supply pressure port and the tank port when the valve is in a neutral position.

It will be appreciated that this background description has been provided to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

The present disclosure, in one aspect, is directed to embodiments of a pressure control valve. In embodiments, a pressure control valve includes means for reducing a pilot flow between a supply pressure port and a tank port thereof when the pressure control valve is in a neutral position.

In one embodiment, a pressure control valve includes a body, a spool, a biasing element, a pilot flow valve assembly, and a pilot flow control assembly. The body defines an axial bore, a supply port, a work port, and a tank port. Each of the supply port, the work port, and the tank port are in fluid communication with the axial bore.

The spool is disposed within the axial bore of the body and axially movable over a range of travel between: (i) a neutral position, in which the supply port and the work port are in fluid isolation from each other and the work port and the tank port are in fluid communication with each other, and (ii) a shifted position, in which the supply port and the work port are in fluid communication with each other and the work port and the tank port are in fluid isolation from each other. At least one of the spool and the body defines a pilot flow passage. The pilot flow passage is in fluid communication with the supply port and the tank port when the spool is in the neutral position. The biasing element is operatively arranged with the spool to bias the spool to the neutral position.

The pilot flow valve assembly is configured to selectively occlude the pilot flow passage. The pilot flow valve assembly includes a closure element movable between an open position in which the pilot flow passage is open and a closed position in which the pilot flow passage is occluded.

The pilot flow control assembly is disposed in the pilot flow passage. The pilot flow control assembly includes a first control element and a second control element. The first control element is secured relative to the spool, and the second control element is secured relative to the body such that the first control element is axially movable with respect to the second control element upon axial movement of the spool. The first control element and the second control element define, when the spool is in the neutral position, a restricted pilot flow path along the pilot flow passage including a restriction. The restriction varies as a function of the spool position over the range of travel such that the flow of hydraulic fluid through the pilot flow passage is variably restricted along the range of travel of the spool.

In another embodiment, a pressure control valve includes a body, a spool, a biasing element, a pilot flow valve assembly, and means for restricting pilot flow through the pilot flow passage. The body defines an axial bore, a supply port, a work port, and a tank port. Each of the supply port, the work port, and the tank port are in fluid communication with the axial bore.

The spool is disposed within the axial bore of the body and axially movable over a range of travel between: (i) a neutral position, in which the supply port and the work port are in fluid isolation from each other and the work port and the tank port are in fluid communication with each other, and (ii) a shifted position, in which the supply port and the work port are in fluid communication with each other and the work port and the tank port are in fluid isolation from each other. At least one of the spool and the body defines a pilot flow passage in fluid communication with the supply port and the tank port when the spool is in the neutral position. The biasing element is operatively arranged with the spool to bias the spool to the neutral position.

The pilot flow valve assembly is configured to selectively occlude the pilot flow passage. The pilot flow valve assembly includes a closure element movable between an open position in which the pilot flow passage is open and a closed position in which the pilot flow passage is occluded. The means for restricting pilot flow define, when the spool is in the neutral position, a restricted pilot flow path along the pilot flow passage including a restriction, the restriction being configured to variably restrict flow of hydraulic fluid through the pilot flow passage, the restriction varying as a function of the spool position over the range of travel.

In still another aspect, embodiments of a hydraulic control system are disclosed. In one embodiment, a hydraulic control system includes a pump, a tank, an actuator, and a pressure control valve. The pump is adapted to provide a source of pressurized fluid, and the tank is adapted to hold a reservoir of fluid. The tank is in fluid communication with the pump. The actuator is in selective fluid communication with the pump. The actuator defines a chamber therein adapted to receive pressurized fluid. The pressure control valve is in fluid communication with the pump, the tank, and the actuator with the pressure control valve interposed between the pump and the actuator and between the actuator and the tank.

The pressure control valve includes a body, a spool, a biasing element, a pilot flow valve assembly, and a pilot flow control assembly. The body defines an axial bore, a supply port, a work port, and a tank port. Each of the supply port, the work port, and the tank port are in fluid communication with the axial bore. The supply port is in fluid communication with the pump. The work port is in fluid communication with the chamber of the actuator. The tank port is in fluid communication with the tank.

The spool is disposed within the axial bore of the body and axially movable over a range of travel between (i) a neutral position, in which the supply port and the work port are in fluid isolation from each other and the work port and the tank port are in fluid communication with each other to thereby fluidly connect the chamber of the actuator to the tank, and (ii) a shifted position, in which the supply port and the work port are in fluid communication with each other to thereby fluidly connect the pump to the chamber of the actuator and the work port and the tank port are in fluid isolation from each other. At least one of the spool and the body defines a pilot flow passage in fluid communication with the supply port and the tank port when the spool is in the neutral position. The biasing element is operatively arranged with the spool to bias the spool to the neutral position.

The pilot flow valve assembly is configured to selectively occlude the pilot flow passage. The pilot flow valve assembly includes a closure element movable between an open position in which the pilot flow passage is open and a closed position in which the pilot flow passage is occluded. The pilot flow control assembly is disposed in the pilot flow passage. The pilot flow control assembly includes a first control element and a second control element. The first control element is secured relative to the spool, and the second control element secured relative to the body such that the first control element is axially movable with respect to the second control element upon axial movement of the spool. The first control element and the second control element define, when the spool is in the neutral position, a restricted pilot flow path along the pilot flow passage including a restriction, the restriction varying as a function of the spool position over the range of travel such that the flow of hydraulic fluid through the pilot flow passage is variably restricted along the range of travel of the spool.

Further and alternative aspects and features of the disclosed principles will be appreciated from the following detailed description and the accompanying drawings. As will be appreciated, the pressure control valves and hydraulic control systems disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 5 is a view of the hydraulic cartridge valve as in FIG. 1, but illustrating the hydraulic cartridge valve in an intermediate position.

FIG. 6 is a view of the hydraulic cartridge valve as in FIG. 1, but illustrating the hydraulic cartridge valve in a shifted position.

FIG. 16 is an elevational view, partially in section, of an embodiment of a hydraulic cartridge valve constructed in accordance with principles of the present disclosure, illustrating the hydraulic cartridge valve in a neutral position.

FIG. 17 is an enlarged, detail view taken from FIG. 16 as indicated by circle XVII XVII.

FIG. 18 is an elevational view, partially in section, of an embodiment of a hydraulic cartridge valve constructed in accordance with principles of the present disclosure, illustrating the hydraulic cartridge valve in a neutral position.

FIG. 19 is an enlarged, detail view taken from FIG. 18 as indicated by circle XIX XIX.

Figure 1:
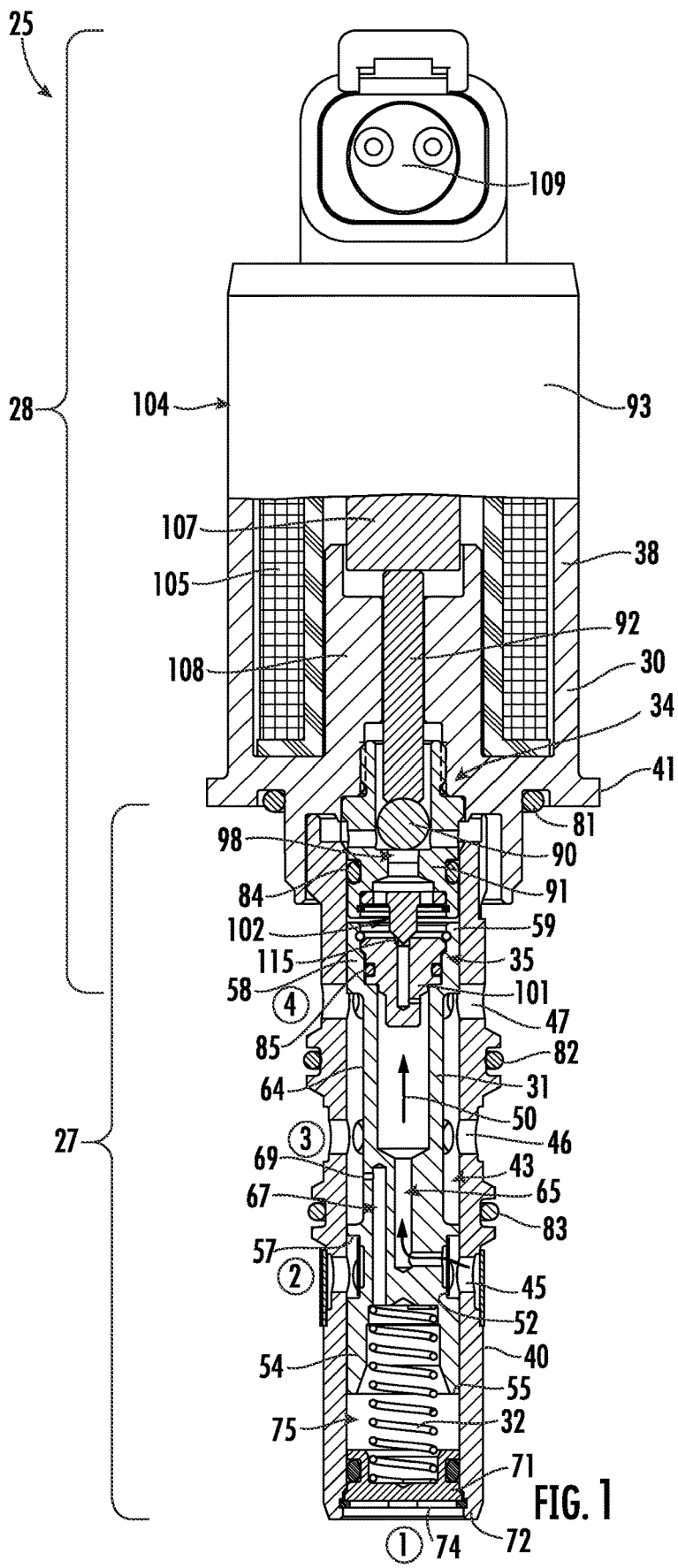
FIG. 1 is an elevational view, partially in section, of an embodiment of a hydraulic cartridge valve constructed in accordance with principles of the present disclosure, illustrating the hydraulic cartridge valve illustrated in a neutral position.

It should be understood that the drawings are not necessarily to scale and that the disclosed embodiments are illustrated diagrammatically and in partial views. In certain instances, details which are not necessary for an understanding of this disclosure or which render other details difficult to perceive may have been omitted. It should be understood that this disclosure is not limited to the particular embodiments illustrated herein.

DETAILED DESCRIPTION OF EXEMPLARY EMBODIMENTS

Embodiments of a pressure control valve constructed in accordance with principles of the present disclosure include means for reducing a pilot flow between a supply port and a tank port thereof when the pressure control valve is in a neutral position. Embodiments of a pressure control valve constructed in accordance with principles of the present disclosure comprise a pilot-operated proportional pressure control valve in the form of a hydraulic cartridge valve that includes means for reducing a pilot flow between a supply port and a tank port in which the pilot flow reducing means comprise a pilot flow control assembly in a pilot stage to significantly reduce the pilot flow between the supply port and the tank port when the valve is in a neutral position. In embodiments, a hydraulic cartridge valve comprises a pilot flow control assembly including a first control element and a second control element that define, when the spool is in the neutral position, a restricted pilot flow path along a pilot flow passage including a first orifice and a second orifice in serial relationship with each other. In embodiments, the second orifice has a cross-sectional area equal to or less than the cross-sectional area of the first orifice.

Embodiments of a pressure control valve constructed according to principles of the present disclosure can comprise a two-stage valve including a main stage and a pilot stage adapted to use pilot flow to control a main stage spool. The pilot flow is controlled by limiting the flow of oil through a pair of small orifices in series relationship with each other. The leakage control element is configured to be self-cleaning. When the coil is energized, the spool will move away from the pilot pin and flush out any contaminate that is trapped in the spool or orifice passages to the tank port.

Embodiments of a pressure control valve constructed according to principles of the present disclosure can have a wide variety of different forms, as will be appreciated by one skilled in the art. For example, in embodiments, a pressure control valve constructed according to principles of the present disclosure can be, for example, in the form of a pilot-operated proportional pressure control cartridge valve. In other embodiments, a hydraulic valve constructed according to principles of the present disclosure can comprise a pilot flow control assembly applied to other hydraulic valves that utilize pilot flow to control the main stage spool.

Embodiments of a hydraulic control system constructed in accordance with principles of the present disclosure can selectively operate an actuator (e.g., cylinder) using an embodiment of a pressure control valve constructed in accordance with principles of the present disclosure. Embodiments of a pressure control valve constructed in accordance with principles of the present disclosure can be used to control the pressure inside an actuator. The control pressure is proportional to the amount of current applied to the coil of the pressure control valve. The current can be variably adjusted across a prescribed range using a variable electric input.

Turning now to the Figures, there is shown in FIG. 1 an embodiment of a hydraulic cartridge pressure control valve 25 constructed according to principles of the present disclosure. The illustrated valve comprises a pilot-operated proportional pressure control valve that includes a main stage 27 and a pilot stage 28. The illustrated pressure control valve includes a body 30, a spool 31, a biasing element 32 in the form of a spring, a pilot flow valve assembly 34, and means for restricting pilot flow through the pilot flow passage in the form of a pilot flow control assembly 35.

In embodiments, the body 30 can have any configuration suitable for the intended application(s) of the pressure control valve 25. In embodiments, the body 30 can be made from a plurality of components that are assembled together to define an axial bore 43 and a plurality of ports in communication with the axial bore 43. In embodiments, the body 30 can be configured to facilitate the installation of the pressure control valve 25 in a hydraulic body, manifold or other suitable component.

In the illustrated embodiment, the body 30 includes a frame 38 and a cage 40. In embodiments, the frame 38 and the cage 40 can be made using any suitable technique as will be appreciated by one skilled in the art. For example, in embodiments, the frame 38 can comprise a cold-forged frame that is machined to its final shape. The lower portion of the frame 38 interfaces with the cage 40 and is assembled by forming the end of the frame 38 over the cage 40. In embodiments, the cage 40 can be mounted to the frame 38 using any suitable technique, such as by being threadedly engaged therewith as shown in FIG. 1.

The frame 38 includes a circular flange 41 configured to secure the valve 25 within a valve cavity by use of a mounting plate (not shown). In other embodiments, the body 30 can include an external threaded surface that is adapted to be threadedly engaged with a body, manifold, or other suitable component to allow the pressure control valve 25 to be used in a hydraulic circuit.

In the illustrated embodiment, the main stage 27 of the pressure control valve 25 comprises the cage 40, the spool 31, and the biasing member 32. The cage 40 is hollow and is configured to be inserted into a cavity formed in a suitable housing such that the valve 25 is in fluid communication with a hydraulic circuit within which the valve 25 is intended to be used.

The cage 40 of the body 30 defines the axial bore 43, a supply port2, a work port3, and a tank port4. Each of the supply port2, the work port3, and the tank port4 are in fluid communication with the axial bore 43. The cage 40 defines three rows of cross-holes 45, 46, 47 in communication with the axial bore 43 with the cross-holes 45, 46, 47 of each row being disposed in spaced relationship to each other around the radial circumference of the cage 40 and respectively defining the supply port2, the work port3, and the tank port4. It should be understood that the names used herein for the ports2-4 defined by the cage 40 are used for convenient reference only and should not be construed to limit the operation of the ports2-4 or the nature of the fluid flow (in either direction) through the ports2-4 of the cage 40.

The spool 31 is disposed within the axial bore 43 of the body 30 and is axially movable over a range of travel between a neutral position, as shown in FIG. 1, and a shifted position, as shown in FIG. 6. When the spool 31 is in the neutral position, the spool 31 prevents fluid flow between the supply port2 and the work port3 such that the supply port2 and the work port3 are in fluid isolation from each other and permits fluid flow between the work port3 and the tank port4 such that the work port3 and the tank port4 are in fluid communication with each other. When the spool 31 is in the shifted position, the spool 31 permits fluid flow between the supply port2 and the work port3 such that the supply port2 and the work port3 are in fluid communication with each other and prevents fluid flow between the work port3 and the tank port4 such that the work port3 and the tank port4 are in fluid isolation from each other. In embodiments, the pressure control valve 25 is configured such that the spool 31 has a range of travel including at least one intermediate position between the neutral position and the shifted position in which the work port3 is in fluid communication with both the tank port4 and the supply port2.

Figure 2:
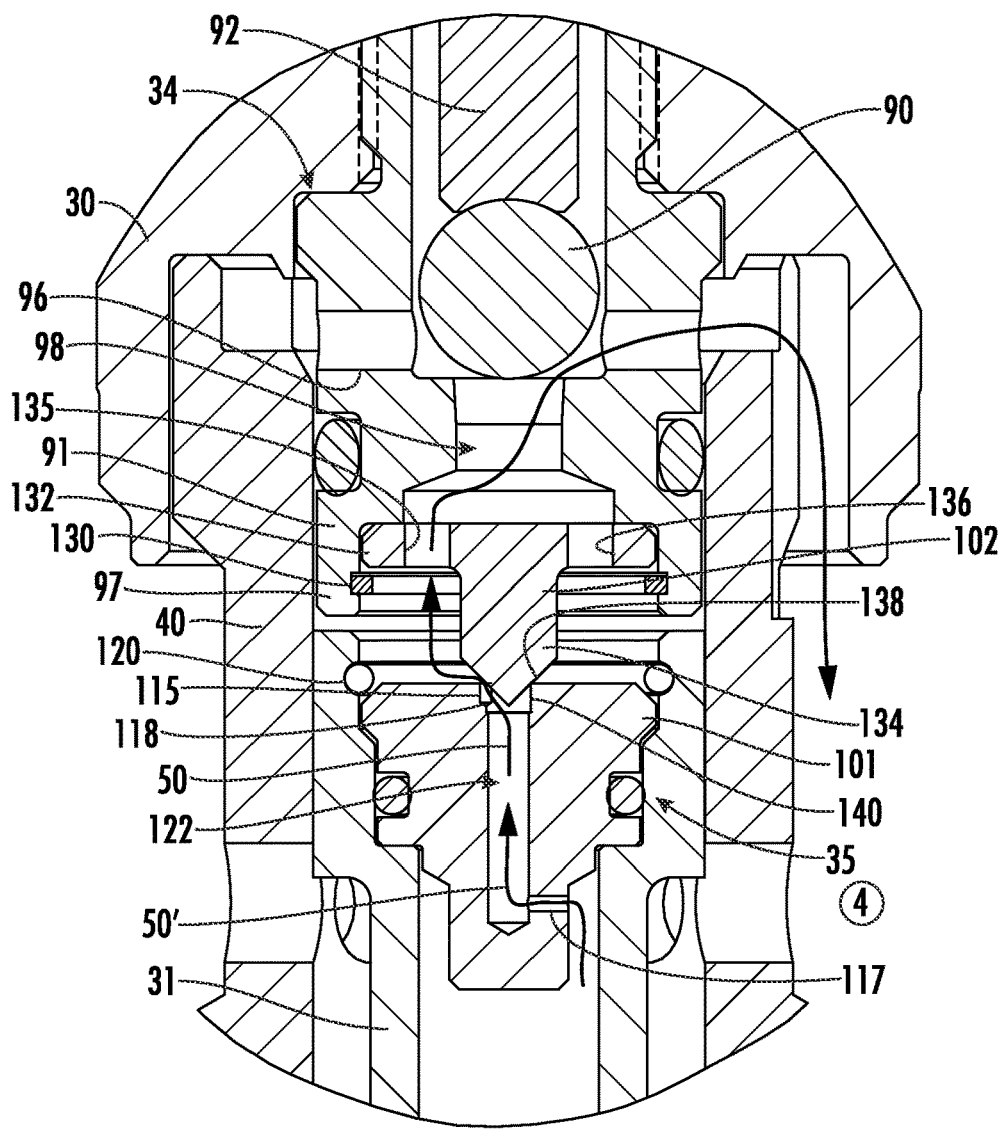
FIG. 2 is an enlarged detail view of the hydraulic cartridge valve taken from FIG. 1, illustrating an embodiment of a pilot flow control assembly constructed in accordance with principles of the present disclosure.

Referring to FIGS. 1 and 2, in embodiments, at least one of the spool 31 and the body 30 define a pilot flow passage 50 in fluid communication with the supply port2 and the tank port4 when the spool 31 is in the neutral position. In the illustrated embodiment, the spool 31 and the body 30 cooperate together to define the pilot flow passage 50. The illustrative pilot flow passage 50 of the pressure control valve 25 is indicated by the arrows found in FIGS. 1 and 2. In embodiments, the pilot flow passage 50 is in communication with the supply port2 and the tank port4 over the entire range of travel of the spool 31. In embodiments, the degree to which the pilot flow passage 50 is restricted can vary as a function of the position of the spool 31 over the range of travel between the neutral position and the shifted position.

For example, in the illustrated embodiment, the spool 31 defines a counterbore opening 52 which leads to the pilot flow passage 50. As the spool 31 moves from the intermediate position shown in FIG. 5 to the shifted position shown in FIG. 6, the counterbore opening 52 to the pilot flow passage 50 closes so that the pilot flow passage 50 becomes more and more restricted.

Referring to FIG. 1, the spool 31 includes a supply land 54 at a first end 55 having a supply groove 57 defined therein and a tank land 58 at a second end 59. A work groove 64 is defined between the supply land 54 and the tank land 58. The spool 31 defines a pilot flow passage portion 65 that extends between the supply groove and the open second end 59 of the spool 31. The spool 31 defines a damping flow passage 67 having a damping orifice 69 therein and extending between the work groove 64 and the open first end 55 of the spool 31.

The supply land 54 is configured to block the row of metering cross holes 45 comprising the supply port2 from being in fluid communication with the work port3 when the spool 31 is in the neutral position and to permit fluid flow therebetween when the spool 31 is in the shifted position (see FIG. 6). The supply groove 57 is configured to fluidly connect the supply port2 and the pilot flow passage 50 when the spool 31 is in the neutral position but not when the spool 31 is in the shifted position (see FIG. 6). The supply land 54 is configured to block the row of metering cross holes 45 comprising the supply port2 from being in fluid communication with pilot flow passage 50 when the spool 31 is in the shifted position (see FIG. 6).

The work groove 64 is configured to fluidly connect the work port3 and the tank port4 when the spool 31 is in the neutral position but not when the spool 31 is in the shifted position (see FIG. 6). Rather, the work groove 64 is configured to fluidly connect the work port3 and the supply port2 when the spool 31 is in the shifted position (see FIG. 6).

The tank land 58 is configured to permit fluid flow between the respective rows of metering cross holes 47, 46 comprising the tank port4 and the work port3 when the spool 31 is in the neutral position. The tank land is configured to prevent the tank port4 from being in fluid communication with the work port3 and to prevent the pilot flow passage 50 from being in fluid communication with the tank port4 when the spool 31 is in the shifted position (see FIG. 6).

Referring to FIG. 1, in the illustrated embodiment, a plug 71 is disposed within the axial bore 43 of the body 30 and is secured to the cage 40 at a distal end 72 of the cage 40 to occlude the axial bore 43, thereby occluding an axial port1 of the body 30. The plug 71 is secured to the cage 40 by a retaining ring 74. The plug 71 and the spool 31 cooperate with the cage 40 of the body 30 to define a spring chamber 75 within the axial bore 43. The work port3 and the spring chamber 75 are in fluid communication with each other via the damping flow passage 67 of the spool 31 over the range of travel of the spool 31 between the neutral position and the shifted position (see FIG. 6).

In the illustrated embodiment, the biasing element 32 comprises a spring. In other embodiments, any other structure and/or technique for biasing the spool 31 to the neutral position can be used. The spring 32 is operatively arranged with the spool 31 to bias the spool 31 to the neutral position, as shown in FIG. 1. The spring 32 is disposed within the spring chamber 75 such that opposing ends of the spring 32 respectively act against the plug 71 and the spool 31.

The spring 32 provides a bias force to put the spool 31 in the neutral position when the coil 105 is de-energized, thereby blocking the supply port2 from the work port3. This type of spool design is known as "closed-in-transition" or "positive overlap." In embodiments, the closed-in-transition spool configuration is used in pressure reducing/relieving valve applications to help maintain the stability of the valve (reducing/inhibiting pressure oscillations during operation). In the illustrated embodiment, damping of the valve 25 is accomplished by controlling the flow of hydraulic fluid in and out of the spring chamber 75 via the damping orifice 69.

A plurality of seal members 81-85 provided to help provide a sealing arrangement within the valve 25 and between the valve body and the structure to or into which the pressure control valve 25 is mounted. The seal members 81-83 provide sealing between the ports2-4 and prevent external leakage. The seal members 84, 85 provide internal sealing within the valve 25. In embodiments, the seal members 81-85 can have any suitable form and construction, such as suitable O-ring seals, and can be provided in any suitable number to provide hydraulic isolation and/or seals to inhibit leakage, as appropriate and as will be understood by one skilled in the art.

The pilot stage 28 of the pressure control valve 25 comprises the pilot flow valve assembly 34 and the pilot flow control assembly 35. The pilot flow valve assembly 34 is configured to selectively occlude the pilot flow passage 50. In the illustrated embodiment, the pilot flow valve assembly 34 is configured to selectively prevent pilot flow from the pilot flow passage 50 out the tank port4.

Referring to FIG. 2, in embodiments, the pilot flow valve assembly 34 includes a closure element 90, a seat 91, a push pin 92, and an actuator 93 (see FIG. 1). The closure element 90 is movable between an open position (as shown in FIG. 2) and a closed position (as shown in FIGS. 5 and 6). When the closure element 90 is in the open position, the pilot flow passage 50 is open. When the closure element 90 is in the closed position, the pilot flow passage 50 is occluded. In the illustrated embodiment, the closure element 90 of the pilot flow valve assembly 34 comprises a spherical ball.

Referring to FIG. 2, in the illustrated embodiment, the seat 91 is secured to the cage 40 of the body 30 by being threadedly engaged therewith. The seat 91 includes a first end 96 and a second end 97. The seat 91 defines a through passage 98 that comprises a portion of the pilot flow passage 50 and that extends from the first end 96 to the second end 97 of the seat 91. The ball 90 is adjacent the first end 96 of the seat 91. In embodiments, one of a pair of control elements 101, 102 of the means for restricting pilot flow is secured to the seat 91 adjacent the second end 97 thereof.

In the illustrated embodiment, the push pin 92 is arranged with the ball 90. The push pin 92 is axially movable in order to selectively place the ball 90 in sealing engagement with the seat 91.

Referring to FIG. 1, in embodiments, the actuator 93 is configured to selectively move the closure element 90 of the pilot flow valve assembly 34 to the closed position. In embodiments, the actuator 93 can be any suitable mechanism configured to selectively move the closure element 90 of the pilot flow valve assembly 34 to the closed position. In the illustrated embodiment, the actuator 93 is mounted to the body 30. In the illustrated embodiment, the actuator 93 is arranged with the push pin 92 and is configured to selectively move the push pin 92 to thereby seat the ball 90 against the seat 91 to occlude the through passage 98 of the seat 91 and thereby occlude the pilot flow passage 50.

In the illustrated embodiment, the actuator 93 comprises a solenoid assembly 104 including a coil 105, an armature 107, and a pole piece 108. The coil 105 is mounted to the frame 38 of the body 30 and is disposed around the armature 107. The coil 105 can be mounted to the frame 38 using any suitable technique as will be familiar to one skilled in the art. In embodiments, the coil 105 is operably arranged with a source of electrical current (not shown) via an electrical connector 109 such that a controller (not shown) can selectively actuate the coil 105 by applying electrical current thereto.

The armature 107 is associated with the coil 105 such that operation of the actuator 93 by a controller can selectively move the armature 107. The armature 107 is disposed within the axial bore 43 of the body 30 and is configured to move toward the pole piece 108 in response to an electrical current being applied to the coil 105. The armature 107 is arranged with the push pin 92 such that the movement of the armature 107 toward the pole piece 108 moves the push pin 92 to thereby move the ball 90 to the closed position and into sealing arrangement with the seat 91. In embodiments, the solenoid assembly 104 is configured such that, when coil 105 is energized, the push pin 92 moves the ball 90 in an amount proportional to the electrical current applied to the coil 105.

In the illustrated embodiment, the pole piece 108 is part of the frame 38 and is configured to limit the movement of the armature 107 to a predetermined range of axial travel. In embodiments, the solenoid assembly 104 has a proportional characteristic where the magnetic attractive force between the frame 38 and the armature 107 is proportional to the current applied to the coil 105. The solenoid force therefore remains constant over the stroke. In embodiments, a non-magnetic spacer can be arranged with the armature 107 to help prevent the armature 107 from latching to the polepiece 108.

Referring to FIG. 2, in embodiments, the means for restricting pilot flow define a restriction 115 along the pilot flow passage 50. The restriction 115 is configured to restrict the flow of hydraulic fluid through the pilot flow passage 50 in a variable manner as a function of the position of the spool 31. In the illustrated embodiment, the restriction 115 is in the form of an orifice.

In embodiments, the means for restricting pilot flow define, when the spool 31 is in the neutral position, a restriction in the form of an orifice 115 in serial relationship with at least one other orifice 117 disposed along the pilot flow passage 50. In embodiments, the orifice 115 defined by the means for restricting pilot flow has a cross-sectional area equal to or less than the cross-sectional area of at least one other orifice 117 disposed along the pilot flow passage 50 when the spool 31 is in the neutral position, as shown in FIG. 2. In embodiments, the size of the orifice 115 defined by the means for restricting pilot flow is variable as a function of the position of the spool 31.

Referring to FIG. 2, in the illustrated embodiment, the means for restricting pilot flow include the pilot flow control assembly 35. In embodiments, the pilot flow control assembly 35 is disposed in the pilot flow passage 50. In the illustrated embodiment, the pilot flow control assembly 35 includes the first control element 101 and the second control element 102. The leakage control elements 101, 102 are used to control the pilot flow leakage. The first control element 101 is secured to the spool 31, and the second control element 102 is secured to the body 30 such that the first control element 101 is movable with respect to the second control element 102 upon axial movement of the spool 31 relative to the body 30. The first control element 101 and the second control element 102 define, when the spool 31 is in the neutral position, a restricted pilot flow path 50' along the pilot flow passage 50 including the first orifice 117 and the second orifice 115 in serial relationship with each other. The second orifice 115 has a cross-sectional area equal to or less than the cross-sectional area of the first orifice 117. In the illustrated embodiment, the first control element 101 comprises a restriction member, and the second control element 102 comprises a pilot pin.

Figure 3:
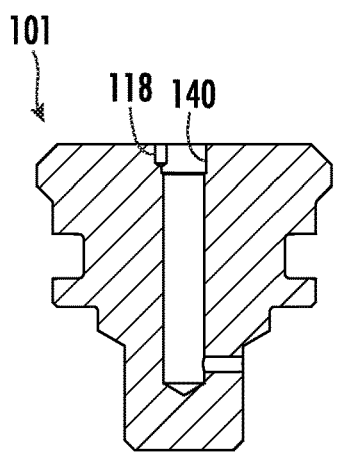
FIG. 3 is an elevational view, in section, of a leakage control element of the hydraulic cartridge valve of FIG. 1.
Figure 4:
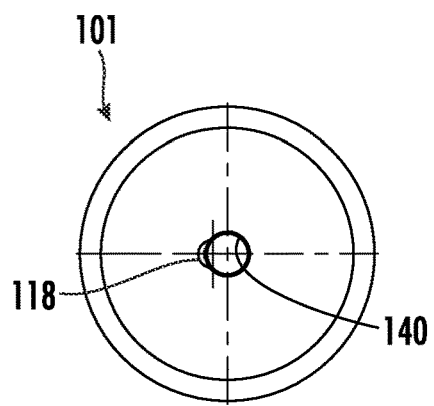
FIG. 4 is a top plan view of the leakage control element of FIG. 3.

In embodiments, the leakage control elements 101, 102 are configured to significantly reduce the pilot flow with supply pressure applied with no current applied to the coil 105. In the illustrated embodiment, the leakage control elements 101, 102 incorporate an offset feature 118 (see also FIGS. 3 and 4) in the first control element 101 which is in the form of the restriction member, or orifice spacer, along with the second control element 102 in the form of the pilot pin that protrudes into the opening 140 of the orifice spacer. The interrelationship between the pilot pin 102 and the offset opening 118 of the restriction member 101 defines the second orifice 115 which comprises a very small open area through which hydraulic fluid can pass, thereby reducing the pilot flow.

Referring to FIG. 2, in the illustrated embodiment, the restriction member 101 is installed in the spool 31 via a spring ring 120. The restriction member 101 defines a through passage 122 comprising a portion of the restricted pilot flow path 50' including the orifice 117. The orifice 117 in the restriction member 101 is fixed in that the size of the orifice 117 is constant over the range of travel of the spool 31 and the restriction member 101. The restriction member 101 is disposed in the pilot flow passage 50 such that the pilot flow through the pilot flow passage 50 is directed through the fixed orifice 117 in the portion of the restricted pilot flow path 50' defined by the restriction member 101.

In embodiments, the pilot flow passage 50 can omit the fixed orifice 117 such that the pilot flow passage 50 includes only the variable orifice 115 of the means for restricting pilot flow. In embodiments, the pilot flow passage 50 can include one or more fixed orifices disposed along the pilot flow passage 50 and each in serial relationship with the variable orifice 115 of the means for restricting pilot flow.

The restriction member 101 is configured to control flow of hydraulic fluid into the pilot stage 28. The size of the first orifice 117 controls the pilot flow leakage.

In the illustrated embodiment, the pilot pin 102 is secured to the seat 91 with a retaining ring 130. In embodiments, the pilot pin 102 and the seat 91 can be combined into one part, thereby eliminating the need for the retaining ring 130. The pilot pin 102 includes a base 132 and a pin portion 134. The base is generally disc-shaped and defines a pair of passages 135, 136 therethrough in order to all pilot flow therethrough. The pin portion 134 of the pilot pin 102 has a conical distal end 138 which is arranged with an opening 140 of the through passage 122 of the restriction member 101 to define the second orifice 115 when the spool 31 is in the neutral position. The conical distal end 138 of the pilot pin 102 extends into the through passage 122 of the restriction member 101.

In the illustrated embodiment, when the spool 31 is in the neutral position, the first control element 101 and the second control element 102 are in a first position with respect to each other and cooperate together to define the second orifice 115 therebetween. When the spool 31 is in the shifted position (see FIG. 6), the first control element 101 and the second control element 102 are in a second position with respect to each other that is different from the first position such that a clearance 141 is defined therebetween that is different from the second orifice 115 in at least one of shape and size such that the restricted pilot flow path 50' does not include the second orifice 115 when the spool 31 is in the shifted position.

Referring to FIG. 1, the spring 32 under the spool 31 is configured to keep the restriction member 101 seated against the pilot pin 102 in the neutral position. In embodiments, the pre-load force from the spring 32 is slightly greater than the force due to the inlet pressure acting over the restriction member 101 center hole diameter. In embodiments of the present disclosure, a small amount of pilot flow through the second orifice 115 is provided to prevent pressure from building in the pilot stage 28 that is greater than the spring force of the spring 32, which would cause the spool 31 to self-shift out of the neutral position.

Referring to FIG. 1, the illustrated embodiment of the pressure control valve 25 is shown with the spool 31 in the neutral position. When the spool 31 is in the neutral position, the supply land 54 of the spool 31 prevents fluid flow between the supply port2 and the work port3. The supply groove 57 permits fluid flow between the supply port2 and the tank port4 via the pilot flow passage 50. The work groove 64 permits fluid flow between the work port3 and the spring chamber via the damping flow passage 67. The work groove 64 permits fluid flow between the work port3 and the tank port4.

Referring to FIG. 5, the illustrated embodiment of the pressure control valve 25 is shown with the spool 31 in an intermediate position between the neutral position and the shifted position. When the spool 31 is in the illustrated intermediate position, the supply land 54 of the spool 31 prevents fluid flow between the supply port2 and the work port3. The supply groove 57 permits fluid flow between the supply port2 and the pilot chamber 143 defined between the first and second control elements 101, 102 via the pilot flow passage 50. The work groove 64 permits fluid flow between the work port3 and the spring chamber 75 via the damping flow passage 67. The tank land 58 of the spool 31 prevents fluid flow between the work port3 and the tank port4.

Referring to FIG. 6, the illustrated embodiment of the pressure control valve 25 is shown with the spool 31 in the shifted position. When the spool 31 is in the shifted position, the supply land 54 of the spool 31 prevents fluid flow between the supply port2 and the work port3 and prevents fluid flow between the supply port2 and the pilot chamber 143 via the pilot flow passage 50. The work groove 64 permits fluid flow between the supply port2 and the work port3 and between the work port3 and the spring chamber 75 via the damping flow passage 67. The tank land 58 of the spool 31 prevents fluid flow between the work port3 and the tank port4.

Referring to FIG. 1, when the coil 105 is de-energized, the spool 31 of the embodiment of the valve 25 depicted in FIG. 1 allows bidirectional flow between the work port3 and the tank port4 while blocking hydraulic fluid flow from the supply port2 to the work port3. In this mode of the pressure control valve 25, the supply port2 is connected to the tank port4, which is known as "pilot flow" or leakage. Embodiments of a pressure control valve constructed according to principles of the present disclosure can operate to reduce the pilot flow by more than half, and by up to about 90% in other embodiments, of the pilot flow that would otherwise be present in the absence of means for reducing pilot flow constructed according to principles of the present disclosure, including the leakage control elements discussed herein.

Referring to FIG. 5, when the coil 105 is energized, the armature 107 becomes attracted to the frame 38 and pushes, via the push pin 92, the ball 90 against the seat 91 which blocks the flow of hydraulic fluid through the pilot flow passage 50. The pilot chamber 143, the area between the seat 91 and the spool 31, fills with hydraulic fluid and pressurizes the spool end 55 at the spring chamber 75, thereby causing the spool 31 to move down and compress the spring 32.

Referring to FIG. 6, once sufficient current is applied to the coil 105, the spool 31 will compress the spring 32 below the spool 31 to the point where the spool 31 is in the shifted position, as shown in FIG. 6, and connects the supply port2 to the work port3. When the coil 105 is energized such that the supply port2 is connected to the work port3, pressure at the work port3 is controlled proportionally to the amount of current applied to the coil 105. If the pressure at the work port3 exceeds the setting controlled by the coil 105, the pressure is relieved to the tank port4.

In the illustrated embodiment, the leakage control elements 101, 102 are configured to be self-cleaning. When the coil 105 is energized, the spool 31 will move away from the pilot pin 102 and flush out any contamination that is trapped in the spool 31 or orifice passages to the tank port4.

Embodiments of a pressure control valve constructed in accordance with principles of the present disclosure can provide a reduction in pilot flow leakage relative to a pressure control valve that does not include means for reducing pilot flow following principles of the present disclosure. Embodiments of a pressure control valve constructed in accordance with principles of the present disclosure can include leakage control elements that reduce or eliminate the need for a secondary valve which reduces overall cost of the hydraulic control circuit. Embodiments of a pressure control valve constructed in accordance with principles of the present disclosure can provide desired performance characteristics that are primarily unaffected by the reduction in the de-energized pilot flow provided by the means for reducing pilot flow following principles of the present disclosure.

Referring to FIGS. 7-15, other embodiment of means for restricting pilot flow constructed in accordance with principles of the present disclosure are depicted therein. In particular, embodiments of first and second leakage control elements constructed according to principles of the present disclosure and comprising means for restricting pilot flow are shown in FIGS. 7-15. It should be understood that the means for restricting pilot flow can be carried out in other equivalent ways which will be appreciated by one skilled in the art.

Figure 7:
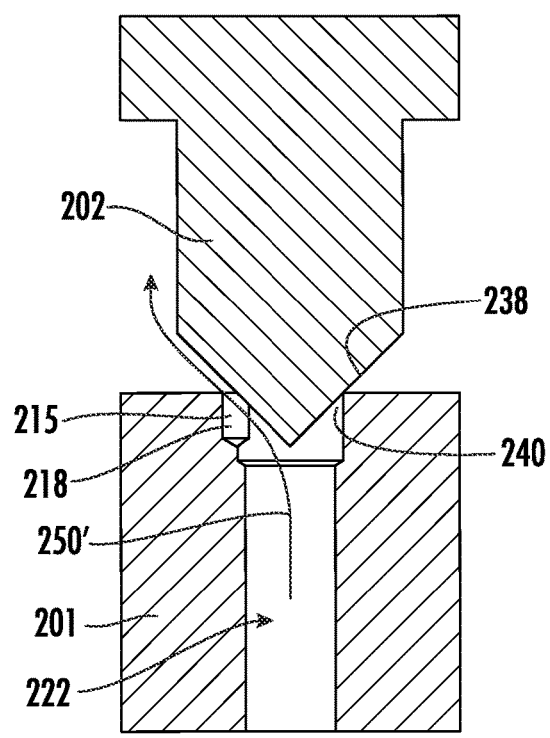
FIGS. 7-12 are each an elevational view, in section, of a respective embodiment of a pilot flow control assembly suitable for use in an embodiment of a hydraulic cartridge valve constructed in accordance with principles of the present disclosure.

Referring to FIG. 7, an embodiment of means for restricting pilot flow comprising first and second leakage control elements 201, 202 are shown which are suitable for use in a pressure control valve constructed according to principles of the present disclosure. In the illustrated embodiment, the first leakage control element 201 comprises a restriction member, and the second control element 202 comprises a pilot pin. The restriction member 201 defines a through passage 222 having an opening 240 that includes an offset hole 218. When installed in a pressure control valve constructed according to principles of the present disclosure, the through passage 222 of the restriction member 201 comprises a portion of the restricted pilot flow path 250' including the first orifice (not shown).

The pilot pin 202 includes a conical distal end 238. The conical distal end 238 of the pilot pin 202 projects into the portion of the restricted pilot flow path 250' defined by the restriction member 201 and cooperates with the offset hole 218 to define the second orifice 215 when the spool is in the neutral position. When the spool is moved from the neutral position to the shifted position, the first and second leakage control elements 201, 202 can move axially with respect to each other such that the conical distal end 238 of the pilot pin 202 is axially displaced relative to the offset hole 218 of the restriction member 201 to effectively remove the second orifice 215 from the pilot flow path. The restriction member 201 and the pilot pin 202 of FIG. 7 can be respectively similar in construction and function to the restriction member 101 and the pilot pin 102 of FIG. 1 in other respects.

Figure 8:
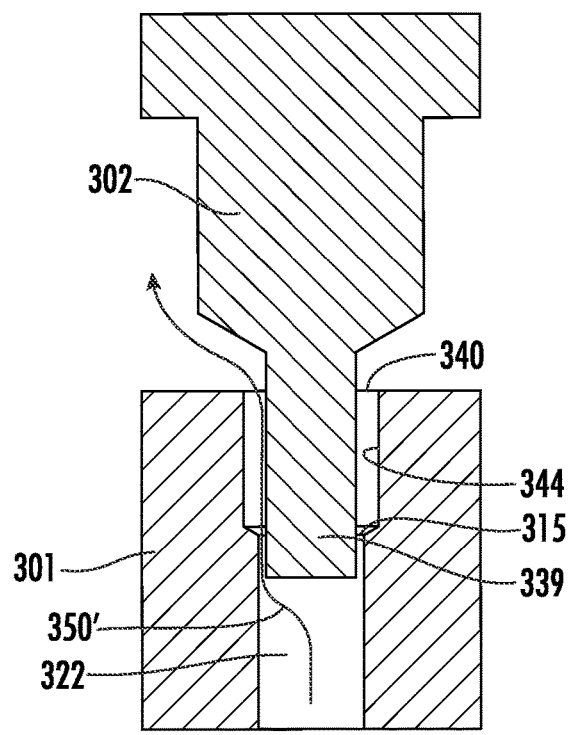

Referring to FIG. 8, an embodiment of means for restricting pilot flow comprising first and second leakage control elements 301, 302 are shown which are suitable for use in a pressure control valve constructed according to principles of the present disclosure. In the illustrated embodiment, the first leakage control element 301 comprises a restriction member, and the second control element 302 comprises a pilot pin. The restriction member 301 defines a through passage 322 having an opening 340 that includes a counterbore 344 with a diameter greater than that of the through passage 322. When installed in a pressure control valve constructed according to principles of the present disclosure, the through passage 322 of the restriction member 301 comprises a portion of the restricted pilot flow path 350' including the first orifice (not shown).

The pilot pin 302 includes a cylindrical distal end 339. The cylindrical distal end 339 of the pilot pin 302 extends through the counterbore 344 into the through passage 322 of the restriction member 301 and cooperates therewith to define the second orifice 315 when the spool is in the neutral position. When the spool is moved from the neutral position to the shifted position, the first and second leakage control elements 301, 302 can move axially with respect to each other such that the cylindrical distal end 339 of the pilot pin 302 is axially displaced relative to the counterbore 344 of the restriction member 301 to effectively remove the second orifice 315 from the pilot flow path. The restriction member 301 and the pilot pin 302 of FIG. 8 can be respectively similar in construction and function to the restriction member 101 and the pilot pin 102 of FIG. 1 in other respects.

Figure 9:
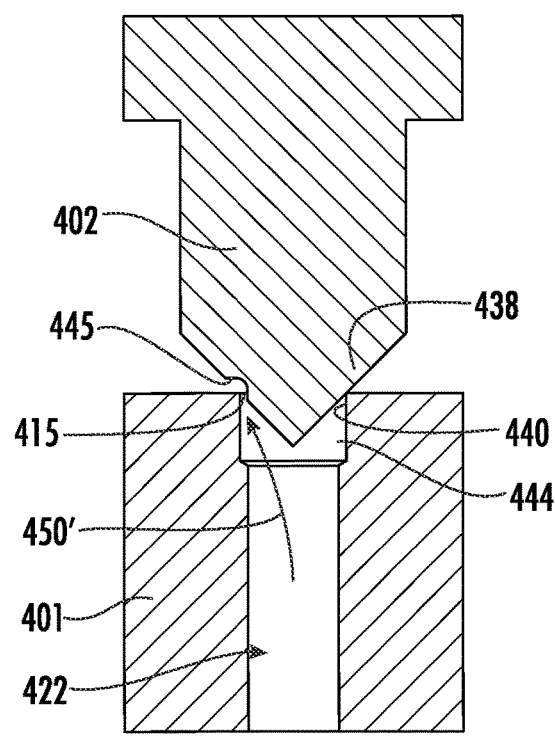

Referring to FIG. 9, an embodiment of means for restricting pilot flow comprising first and second leakage control elements 401, 402 are shown which are suitable for use in a pressure control valve constructed according to principles of the present disclosure. In the illustrated embodiment, the first leakage control element 401 comprises a restriction member, and the second control element 402 comprises a pilot pin. The restriction member 401 defines a through passage 422 having an opening 440 that includes a counterbore 444 with a diameter greater than that of the through passage 422. When installed in a pressure control valve constructed according to principles of the present disclosure, the through passage 422 of the restriction member 401 comprises a portion of the restricted pilot flow path 450' including the first orifice (not shown).

The pilot pin 402 includes a conical distal end 438 that defines an intermediate notch 445. The conical distal end 438 of the pilot pin 402 projects into the portion of the restricted pilot flow path 450' defined by the counterbore 444 of the restriction member 401 such that the intermediate notch 445 of the pilot pin 402 cooperates with the opening 440 of the restriction member 401 to define the second orifice 415 when the spool is in the neutral position. When the spool is moved from the neutral position to the shifted position, the first and second leakage control elements 401, 402 can move axially with respect to each other such that the conical distal end 438 of the pilot pin 402 is axially displaced relative to the opening 440 of the restriction member 401 such that the notch 445 of the pilot pin 402 is no longer in close proximity to the counterbore 444 of the restriction member 401, thereby effectively removing the second orifice 415 from the pilot flow path. The restriction member 401 and the pilot pin 402 of FIG. 9 can be respectively similar in construction and function to the restriction member 101 and the pilot pin 402 of FIG. 1 in other respects.

Figure 10:
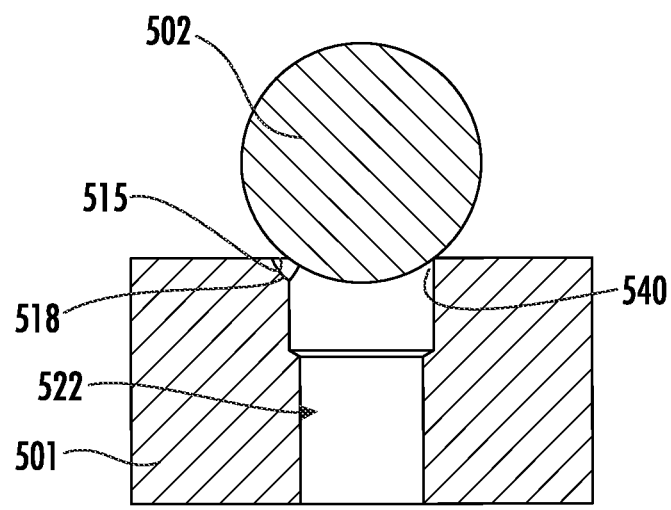

Referring to FIG. 10, an embodiment of means for restricting pilot flow comprising first and second leakage control elements 501, 502 are shown which are suitable for use in a pressure control valve constructed according to principles of the present disclosure. In embodiments, one of the first control element and the second control element comprises a spherical surface, and the other of the first control element and the second control element comprises a restriction member. In the illustrated embodiment, the first leakage control element 501 comprises a restriction member, and the second control element 502 comprises a ball having a spherical exterior surface. The restriction member 501 defines a through passage 522 having an opening 540 that includes an offset hole 518. When installed in a pressure control valve constructed according to principles of the present disclosure, the through passage 522 of the restriction member 501 comprises a portion of the restricted pilot flow path 550' including the first orifice (not shown).

The spherical exterior surface of the ball 502 is arranged with the opening 540 of the through passage 522 of the restriction member 501 and cooperates with the offset hole 518 to define the second orifice 515 when the spool is in the neutral position. When the spool is moved from the neutral position to the shifted position, the first and second leakage control elements 501, 502 can move axially with respect to each other such that the ball 502 is axially displaced relative to the opening 540 of the restriction member 501 such that spherical exterior surface of the ball 502 is no longer in close proximity to the offset hole 518 of the restriction member 501, thereby effectively removing the second orifice 515 from the pilot flow path. The restriction member 501 of FIG. 10 can be similar in construction and function to the restriction member 101 of FIG. 1 in other respects.

Figure 11:
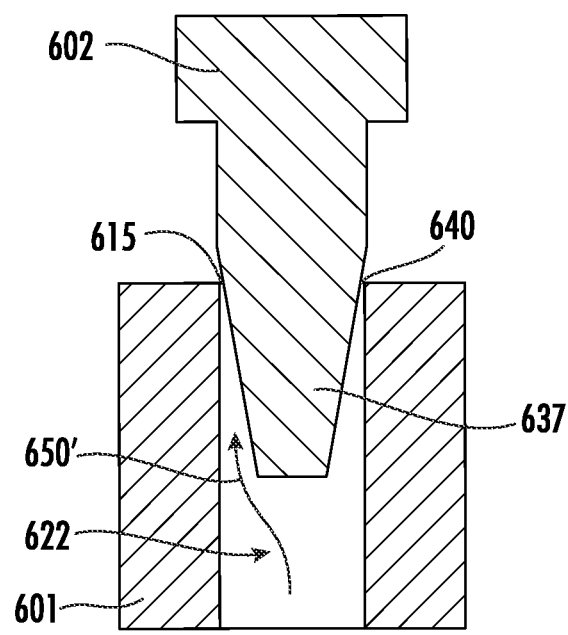

Referring to FIG. 11, an embodiment of means for restricting pilot flow comprising first and second leakage control elements 601, 602 are shown which are suitable for use in a pressure control valve constructed according to principles of the present disclosure. In the illustrated embodiment, the first leakage control element 601 comprises a restriction member, and the second control element 602 comprises a pilot pin. The restriction member 601 defines a through passage 622 having an opening 640. When installed in a pressure control valve constructed according to principles of the present disclosure, the through passage 622 of the restriction member 601 comprises a portion of the restricted pilot flow path 650' including the first orifice (not shown).

The pilot pin 602 includes a tapered distal end 637. The tapered distal end 637 of the pilot pin 602 extends into the through passage 622 of the restriction member 601 and cooperates therewith to define the second orifice 615 when the spool is in the neutral position. When the spool is moved from the neutral position to the shifted position, the first and second leakage control elements 601, 602 can move axially with respect to each other such that the tapered distal end 637 of the pilot pin 602 is axially displaced relative to the opening 640 of the restriction member 601 such that the second orifice 615 is effectively removed from the pilot flow path. The restriction member 601 and the pilot pin 602 of FIG. 11 can be respectively similar in construction and function to the restriction member 101 and the pilot pin 102 of FIG. 1 in other respects.

Figure 12:
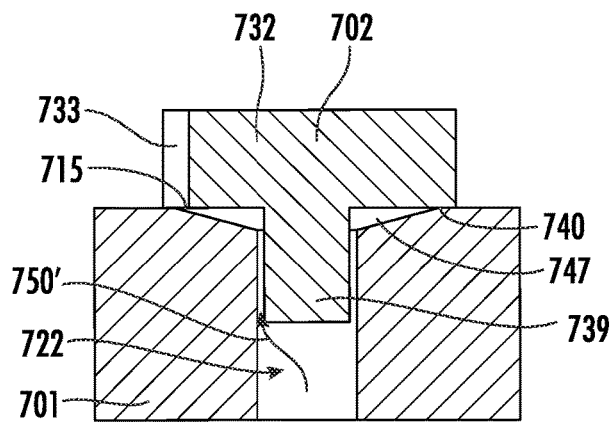
Figure 13:
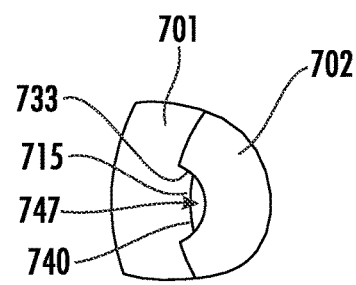
FIG. 13 is a fragmentary, top plan view of the leakage control assembly of FIG. 12, illustrating a notch feature defined therein.

Referring to FIGS. 12 and 13, an embodiment of means for restricting pilot flow comprising first and second leakage control elements 701, 702 are shown which are suitable for use in a pressure control valve constructed according to principles of the present disclosure. In the illustrated embodiment, the first leakage control element 701 comprises a restriction member, and the second control element 702 comprises a pilot pin.

Referring to FIG. 12, the restriction member 701 defines a through passage 722 having an opening 740 that includes a tapered countersink surface 747 circumscribing the opening 740. When installed in a pressure control valve constructed according to principles of the present disclosure, the through passage 722 of the restriction member 701 comprises a portion of the restricted pilot flow path 750' including the first orifice (not shown).

The pilot pin 702 includes a base 732 defining a groove 733 and a cylindrical distal end 739 projecting from the base 732. The cylindrical distal end 739 of the pilot pin 702 extends through the opening 740 of the restriction member 701 into the through passage 722 of the restriction member 701 when the spool is in the neutral position. The groove 733 of the pilot pin 702 cooperates with the tapered countersink surface 747 of the restriction member 701 to define the second orifice 715 when the spool is in the neutral position (see also, FIG. 13). When the spool is moved from the neutral position to the shifted position, the first and second leakage control elements 701, 702 can move axially with respect to each other such that the cylindrical distal end 739 of the pilot pin 702 is axially displaced relative to the opening 740 of the restriction member 701 such that the groove 733 of the pilot pin 702 is no longer in close proximity to the tapered countersink surface 747 of the restriction member 701, thereby effectively removing the second orifice 715 from the pilot flow path. The restriction member 701 and the pilot pin 702 of FIGS. 12 and 13 can be respectively similar in construction and function to the restriction member 101 and the pilot pin 102 of FIG. 1 in other respects.

Figure 14:
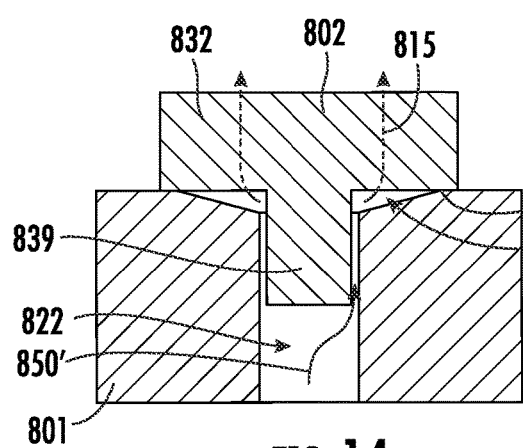
FIGS. 14 and 15 are each an elevational view, in section, of a respective embodiment of a pilot flow control assembly suitable for use in an embodiment of a hydraulic cartridge valve constructed in accordance with principles of the present disclosure.

Referring to FIG. 14, an embodiment of means for restricting pilot flow comprising first and second leakage control elements 801, 802 are shown which are suitable for use in a pressure control valve constructed according to principles of the present disclosure. In the illustrated embodiment, the first leakage control element 801 comprises a restriction member, and the second control element 802 comprises a pilot pin. The restriction member 801 defines a through passage 822 having an opening 840 that includes a tapered countersink surface 847 circumscribing the opening 840. When installed in a pressure control valve constructed according to principles of the present disclosure, the through passage 822 of the restriction member 801 comprises a portion of the restricted pilot flow path 850' including the first orifice (not shown).

The pilot pin 802 includes a base 832 comprising a porous material and a cylindrical distal end 839 projecting from the base 832. The cylindrical distal end 839 of the pilot pin 802 extends through the opening 840 of the restriction member 801 into the through passage 822 of the restriction member 801 when the spool is in the neutral position. The base 832 of the pilot pin 802 cooperates with the tapered countersink surface 847 of the restriction member 801 to define effectively the second orifice 815 through the base 832 when the spool is in the neutral position. In embodiments, the porosity of the base 832 can be adapted to provide an effective orifice 815 through the base 832 according to the intended application of the pressure control valve and the desired flow rate through the effective second orifice 815. When the spool is moved from the neutral position to the shifted position, the first and second leakage control elements 801, 802 can move axially with respect to each other such that the cylindrical distal end 839 of the pilot pin 802 is axially displaced relative to the opening 840 of the restriction member 801 such that the base 832 of the pilot pin 802 is no longer in close proximity to the tapered countersink surface 847 of the restriction member 801, thereby effectively removing the second orifice 815 from the pilot flow path. The restriction member 801 and the pilot pin 802 of FIG. 14 can be respectively similar in construction and function to the restriction member 101 and the pilot pin 102 of FIG. 1 in other respects.

Figure 15:
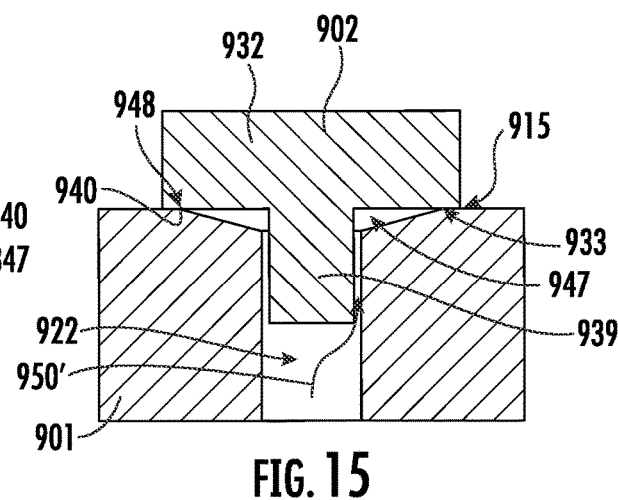

Referring to FIG. 15, an embodiment of means for restricting pilot flow comprising first and second leakage control elements 901, 902 are shown which are suitable for use in a pressure control valve constructed according to principles of the present disclosure. In the illustrated embodiment, the first leakage control element 901 comprises a restriction member, and the second control element 902 comprises a pilot pin. The restriction member 901 defines a through passage 922 having an opening 940 that includes a textured mating surface 948 and a tapered countersink surface 847 circumscribing the opening 940. When installed in a pressure control valve constructed according to principles of the present disclosure, the through passage 922 of the restriction member 901 comprises a portion of the restricted pilot flow path 950' including the first orifice (not shown).

The pilot pin 902 includes a base 932 having a textured mating surface 933 and a cylindrical distal end 939 projecting from the base 932. The cylindrical distal end 939 of the pilot pin 902 extends through the opening 940 into the through passage 922 of the restriction member 901 and the textured mating surface 933 of the pilot pin 902 cooperates with the textured mating surface 948 of the restriction member 901 to define the second orifice 915 when the spool is in the neutral position. The variation in surface features provided by the textured mating surfaces 933, 948 can provide an effective second orifice 915 through which the hydraulic fluid can flow in a restricted manner. In embodiments, the textured surfaces 933, 948 can be varied and configured to provide a desired flow rate for the effective second orifice 915 based upon the intended application of the pressure control valve. When the spool is moved from the neutral position to the shifted position, the first and second leakage control elements 901, 902 can move axially with respect to each other such that the textured mating surface 933 of the pilot pin 902 is no longer in close proximity to the textured mating surface 948 and the tapered countersink surface 947 of the restriction member 901, thereby effectively removing the second orifice 915 from the pilot flow path. The restriction member 901 and the pilot pin 902 of FIG. 15 can be respectively similar in construction and function to the restriction member 101 and the pilot pin 102 of FIG. 1 in other respects.

Referring to FIGS. 16 and 17, another embodiment of a hydraulic cartridge valve 1025 constructed in accordance with principles of the present disclosure is shown. The hydraulic cartridge valve 1025 is illustrated in a neutral position. Referring to FIG. 16, the illustrated valve 1025 comprises a pilot-operated proportional pressure control valve that includes a main stage 1027 and a pilot stage 1028. The illustrated pressure control valve 1025 includes a body 1030, a spool 1031, a biasing element 1032 in the form of a spring, a pilot flow valve assembly 1034, and means for restricting pilot flow through the pilot flow passage in the form of a pilot flow control assembly 1035.

In the illustrated embodiment, the main stage 1027 of the pressure control valve 1025 comprises the cage 1040 of the body 1030, the spool 1031, and the biasing member 1032. The cage 1040 is hollow and is configured to be inserted into a cavity formed in a suitable housing such that the valve 1025 is in fluid communication with a hydraulic circuit within which the valve is intended to be used.

The pilot stage 1028 of the pressure control valve 1025 comprises the pilot flow valve assembly 1034 and the pilot flow control assembly 1035. The pilot flow valve assembly 1034 is configured to selectively occlude the pilot flow passage 1050 defined by the body 30. In the illustrated embodiment, the pilot flow valve assembly 1034 is configured to selectively prevent pilot flow from the pilot flow passage 1050 out the tank port4.

Referring to FIGS. 16 and 17, the pilot flow control assembly 1035 includes the body 1030, the spool 1031, and a control element 1102 mounted to the body 1030. The body 1030 includes an interior bore surface 1048. The body 1030 defines the pilot flow passage 1050 and a pilot cross bore 1051 in fluid communication with the pilot flow passage 1050 (see FIG. 17). The pilot cross bore 1051 is open to the interior bore surface 1048.

Referring to FIG. 17, the spool 1031 includes a pilot land 1053. The pilot land 1053 of the spool 1031 and the interior bore surface 1048 of the body 1030 define the restriction 1015 with the diameter of the pilot land being smaller than the diameter of the interior bore surface 1048 to define the restriction 1015 therebetween. The pilot land 1053 is disposed axially between the pilot cross bore 1051 and the control element 1102 when the spool 1031 is in the neutral position, as shown in FIGS. 16 and 17. The pilot cross bore 1051 is disposed axially between the pilot land 1053 and the first control element 1102 when the spool 1031 is in the shifted position, that is, the pilot land 1053 moves below the pilot cross bore 1051 to effectively remove the restriction 1015 from the pilot flow passage 1050 when the spool 1031 is in the shifted position such that the restriction 1015 is no longer part of the pilot flow passage 1050.

The spool 1031 includes an exterior surface 1060. The exterior surface 1060 of the spool 1031 defines an exterior groove 1061. The exterior groove 1061 of the spool 1031 is in axial alignment with the pilot cross bore 1051 when the spool 1031 is in the neutral position.

The pressure control valve 1025 of FIG. 16 is similar in construction and function to the pressure control valve 25 of FIG. 1 in other respects, as will be appreciated by one skilled in the art.

Referring to FIGS. 18 and 19, another embodiment of a hydraulic cartridge valve 1225 constructed in accordance with principles of the present disclosure is shown. The hydraulic cartridge valve 1225 is illustrated in a neutral position. The illustrated valve 1225 comprises a pilot-operated proportional pressure control valve that includes a main stage 1227 and a pilot stage 1228. The illustrated pressure control valve 1225 includes a body 1230, a spool 1231, a biasing element 1232 in the form of a spring, a pilot flow valve assembly 1234, and means for restricting pilot flow through the pilot flow passage in the form of a pilot flow control assembly 1235.

In the illustrated embodiment, the main stage 1227 of the pressure control valve 1225 comprises the cage 1240 of the body 1230, the spool 1231, and the biasing member 1232. The cage 1240 is hollow and is configured to be inserted into a cavity formed in a suitable housing such that the valve 1225 is in fluid communication with a hydraulic circuit within which the valve 1225 is intended to be used.

The pilot stage 1228 of the pressure control valve 1225 comprises the pilot flow valve assembly 1234 and the pilot flow control assembly 1235. The pilot flow valve assembly 1234 is configured to selectively occlude the pilot flow passage 1250 defined by the cage 1240 of the body 1230. In the illustrated embodiment, the pilot flow valve assembly 1234 is configured to selectively prevent pilot flow from the pilot flow passage 1250 out the tank port4.

Referring to FIGS. 18 and 19, the pilot flow control assembly 1235 includes the body 1230, the spool 1231, and a control element 1302 mounted to the body 1230. The body 1230 defines the pilot flow passage 1250. The body 1230 includes an interior bore surface 1248 defining an interior groove 1249 (see FIG. 19). The interior groove 1249 is in fluid communication with the pilot flow passage 1250 and is open to the interior bore surface 1248.

The spool 1231 includes a pilot land 1253. The pilot land 1253 of the spool 1231 and the interior bore surface 1248 of the body 1230 define the restriction 1215. The pilot land 1253 is disposed axially between the interior groove 1249 of the body 1230 and the control element 1301 when the spool 1231 is in the neutral position. The interior groove 1249 of the body 1230 is disposed axially between the pilot land 1253 and the control element 1301 when the spool 1231 is in the shifted position such that the restriction 1215 is no longer part of the pilot flow passage 1250.

The pressure control valve 1225 of FIG. 18 is similar in construction and function to the pressure control valve 25 of FIG. 1 in other respects, as will be appreciated by one skilled in the art.

Figure 20:
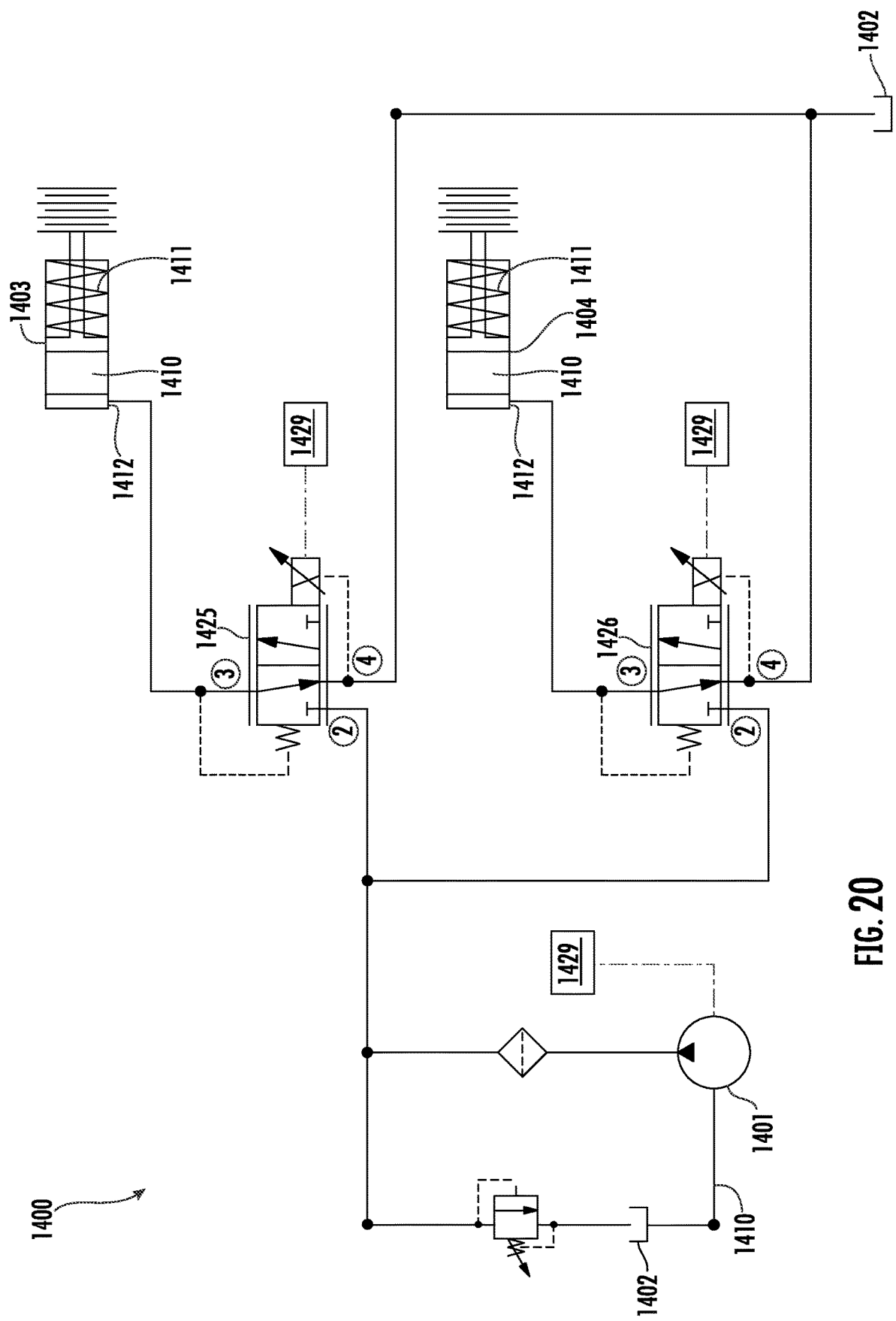
FIG. 20 is a generally schematic view of an embodiment of a hydraulic control system constructed in accordance with principles of the present disclosure, the hydraulic control system including a pair of hydraulic cartridge valves constructed in accordance with principles of the present disclosure respectively associated with a pair of actuators in the form of clutches.

Referring to FIG. 20, an embodiment of a hydraulic control system 1400 constructed according to principles of the present disclosure is shown. The illustrated hydraulic control system 1400 includes a pump 1401, a tank 1402, a pair of actuators 1403, 1404, a pair of hydraulic cartridge valves 1425, 1426 constructed according to principles of the present disclosure, and a controller 1429 (also referred to as an electronic control unit (ECU).

In the illustrated embodiment, the pump 1401 is adapted to provide a source of pressurized fluid. The pump 1401 is adapted to receive a supply of fluid from the tank 1402 and to discharge a flow of fluid therefrom. The pump 1401 is in selective fluid communication with the pair of actuators 1403, 1404 via the pair of valves 1425, 1426, respectively, to selectively deliver a flow of hydraulic fluid to the actuators 1403, 1404.

The pump 1401 is in fluid communication with the tank 1402, which is adapted to hold a reservoir of fluid. In embodiments, the tank 1402 can be in fluid communication with the pump 1401 via any suitable technique. For example, in embodiments, the pump 1401 is in fluid communication with the tank 1402 via a pump supply line 1410 to receive a return flow of hydraulic fluid from the tank 1402, which in turn can be used by the pump 1401 to deliver the flow of hydraulic fluid to the actuators 1403, 1404.

In embodiments, the pump 1401 can be any suitable pump that is acceptable for the intended application, as will be readily understood by one skilled in the art. In embodiments, the pump 1401 can be a fixed-displacement pump or a variable-displacement pump.

In embodiments, the tank 1402 is adapted to hold a reservoir of fluid. In embodiments, the tank 1402 can be any suitable tank known to those skilled in the art. In embodiments, the tank 1402 comprises a reservoir of hydraulic fluid which can be drawn into the pump 1401 in order to generate a flow of hydraulic fluid for the system.

In embodiments, each actuator 1403, 1404 is in selective fluid communication with the pump 1401. In the illustrated embodiment, the actuators 1403, 1404 are in selective fluid communication with the pump 1401 and the tank 1402 via the pair of valves 1425, 1426, respectively. In embodiments, the actuators 1403, 1404 are adapted to use hydraulic power to perform a mechanical work operation. In embodiments, each actuator 1403, 1404 can be any suitable actuator for use in a hydraulic control system compatible with a control valve constructed according to principles of the present disclosure.

In the illustrated embodiment, each of the pair of actuators 1403, 1404 comprises a transmission clutch control which have a similar construction and functionality. Each actuator 1403, 1404 defines a chamber 1410 therein adapted to receive pressurized fluid. A flow of hydraulic fluid into the chamber 1410 of the actuator 1403, 1404 can cause the actuator 1403, 1404 to operate once the pressure in the chamber 1410 overcomes a bias member 1411. The bias member 1411 of the actuator 1403, 1404 is configured to urge the hydraulic fluid from the chamber 1410. An actuator port 1412 of the actuators 1403, 1404 leading to the chamber 1410 is in fluid communication with a respective one of the pair of valves 1425, 1426 to selectively receive a supply flow of pressurized hydraulic fluid from the pump 1401 or to selectively discharge a discharge flow of hydraulic fluid from the chamber 1410 of the actuators 1403, 1404 to the tank 1402.

In embodiments, each pressure control valve 1425, 1426 is in fluid communication with the pump 1401, the tank 1402, and the actuator 1403, 1404 with which the respective pressure control valve 1425, 1426 is associated. In embodiments, each pressure control valve 1425, 1426 is interposed between the pump 1401 and the respective actuator 1403, 1404 and between the respective actuator 1403, 1404 and the tank 1402.

In the illustrated embodiment, the valves 1425, 1426 are each in electrical communication with the controller 1429 and in fluid communication with the pump 1401 and the tank 1402. The pair of valves 1425, 1426 are respectively interposed between the pump 1401 and one of the pair of actuators 1403, 1404. The valves 1425, 1426 are adapted to selectively direct the flow of fluid from the pump 1401 to the chamber 1410 of the respective actuator 1403, 1404 with which the valve 1425, 1426 is associated. The pair of valves 1425, 1426 are respectively interposed between one of the pair of actuators 1403, 1404 and the tank 1402. The pair of valves 1425, 1426 are adapted to selectively direct a return flow of fluid from the chamber 1410 of the respective actuator 1403, 1404 with which the valve 1425, 1426 is associated to the tank 1402.

In the illustrated embodiment, each of the valves 1425, 1426 comprises a valve substantially shown in FIG. 1 and as described above. Each valve 1425, 1426 includes a body, a spool, a biasing element in the form of a spring, a pilot flow valve assembly, and a pilot flow control assembly as described above in connection with the embodiment of a valve shown in FIG. 1. The body defines an axial bore, a supply port2, a work port3, and a tank port4. Each of the supply port2, the work port3, and the tank port4 are in fluid communication with the axial bore. The supply port2 is in fluid communication with the pump 1401. The work port3 is in fluid communication with the chamber 1410 of the respective actuator 1403, 1404 with which the valve 1425, 1426 is associated. The tank port4 is in fluid communication with the tank 1402.

The spool is disposed within the axial bore of the body and axially movable over a range of travel between a neutral position and a shifted position. In the neutral position, the supply port2 and the work port3 are in fluid isolation from each other and the work port3 and the tank port4 are in fluid communication with each other to thereby fluidly connect the chamber 1410 of the respective actuator 1403, 1404 with which the valve 1425, 1426 is associated to the tank 1402. In the shifted position, the supply port2 and the work port3 are in fluid communication with each other to thereby fluidly connect the pump 1401 to the chamber 1410 of the respective actuator 1403, 1404 with which the valve 1425, 1426 is associated and the work port3 and the tank port4 are in fluid isolation from each other.

The spool and the body cooperate together to define a pilot flow passage in fluid communication with the supply port2 and the tank port4 when the spool is in the neutral position. The spring is operatively arranged with the spool to bias the spool to the neutral position.

The valves 1425, 1426 can be similar in other respects to the valve of FIG. 1. For example, the pilot flow valve assembly and the pilot flow control assembly of the valves are substantially the same as the valve of FIG. 1.

The controller 1429 is in electrical communication with the pump 1401 and the valves 1425, 1426. The controller 1429 is configured to selectively operate the actuators 1403, 1404 by controlling the hydraulic cartridge valves 1425, 1426 in response to a suitable input received by the controller 1429, and as will be readily appreciated by one skilled in the art.

In embodiments, the controller 1429 is configured to selectively send a drive signal to the coil of one or both of the actuators 1425, 1426 in response to a predetermined input. The drive signal can comprise a variable electrical current. The controller 1429 can be configured to vary the electrical current passed through the coil of each of the valves 1425, 1426 based upon the input received by the controller 1429.

In embodiments, the controller 1429 can be any suitable electronic control unit or units as will be readily familiar to one skilled in the art. For example, in embodiments, the controller 1429 can comprise a suitable, commercially available plug-in style, microprocessor based valve driver. In embodiments, the controller 1429 can includes a valve driver operably arranged with each valve coil to selectively operate the cartridge valves.

In embodiments, the controller 1429 is configured to receive an input indicating a desired operational characteristic. For example, in embodiments, the controller 1429 includes a suitable graphical user interface configured to allow an operator to enter a desired set point for the cartridge valve 12. In embodiments, the controller 1429 can be in electrical communication with other components, such as, when the hydraulic control system 1400 is used as an on-board control mechanism for a mobile machine, for example.

It will be understood that, in other embodiments, the hydraulic control system 1400 can be configured to selectively and independently operate a plurality of hydraulic cartridge valves constructed according to principles of the present disclosure. It will be understood that, in embodiments, the hydraulic control system 1400 can include other and different components.

Embodiments of a hydraulic control system constructed according to principles of the present disclosure can be used to carry out a method of controlling a hydraulic actuator using an embodiment of a cartridge valve as described above. In embodiments, a method of controlling a hydraulic actuator following principles of the present disclosure can use any embodiment of a hydraulic cartridge valve and/or any embodiment of a hydraulic control system constructed according to principles discussed herein.

In one embodiment, when the valve is de-energized (neutral position) with pressure applied at the supply port2, hydraulic fluid flows from the supply port2 to the tank port4. The hydraulic fluid can pass through a filter screen outside the cage of the valve, then through a second filter attached to the spool. After the hydraulic fluid is filtered, it flows through the drilled first orifice defined in the spool and passes through the pilot flow passage defined axially in the spool. The hydraulic fluid then passes through the leakage control elements and then passes by the ball and out the tank port4 to the tank. The leakage control elements form a second orifice in the pilot flow passage in serial relationship with the first orifice to restrict the amount of pilot flow when the valve is in the de-energized state.

In embodiments, a controller can selectively operate the valve by directing a drive current through the coil of the valve. Once the valve is energized, the leakage control orifice is "de-activated" as the leakage control element mounted to the spool (e.g., a restriction member) moves axially away from the leakage control element mounted to the body (e.g., a pilot pin). The amount of additional restriction results in a trade-off between leakage reduction and response time of the valve. The pilot flow from the supply port2 to the tank port4 is reduced via the leakage control elements as compared to a valve not containing these leakage control elements. The work port3 is connected to the tank port4.

As current is applied to the coil, a magnetic force is established between the armature and the frame pulling the armature toward the frame pole piece face. As the armature moves, so does the pilot pin which seats the ball, blocking the flow of hydraulic fluid past the ball. The pilot chamber (volume between the seat and the spool) begins to fill and pressurize, thereby causing the spool to move down and compress the spring. If sufficient current is applied to the coil, the spool will compress the spring to the point where the spool moves to the shifted position to fluidly connect the supply port2 to the work port3. The amount of current required to build this pressure under the ball is called threshold current. As the ball begins to lift off the seat, the magnetic force of the proportional actuator regulates the pressure in the pilot chamber which regulates the position of the spool. Once the pressure in the work port3 reaches the desired level, the spool will move between a reducing position and a relieving position.

In embodiments, the valve is used with a supply pressure that is at least one bar higher than the maximum reduced pressure at the work port3. Under such conditions, the bias element keeps the valve closed (blocking the supply and work port3) when no current is applied to the coil.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pressure control valve, comprising:
    a body, the body defining an axial bore, a supply port, a work port, and a tank port, each of the supply port, the work port, and the tank port being in fluid communication with the axial bore;
    a spool, the spool being disposed within the axial bore of the body and axially movable over a range of travel between: (i) a neutral position, in which the supply port and the work port are in fluid isolation from each other and the work port and the tank port are in fluid communication with each other, and (ii) a shifted position, in which the supply port and the work port are in fluid communication with each other and the work port and the tank port are in fluid isolation from each other;
    at least one of the spool and the body defining a pilot flow passage, the pilot flow passage in fluid communication with the supply port and the tank port when the spool is in the neutral position;
    a biasing element, the biasing element operatively arranged with the spool to bias the spool to the neutral position;
    a pilot flow valve assembly, the pilot flow valve assembly configured to selectively occlude the pilot flow passage, the pilot flow valve assembly including a closure element movable between an open position in which the pilot flow passage is open and a closed position in which the pilot flow passage is occluded;
    a pilot flow control assembly, the pilot flow control assembly disposed in the pilot flow passage, the pilot flow control assembly including a first control element and a second control element, the first control element being secured relative to the spool, the second control element being secured relative to the body such that the first control element is axially movable with respect to the second control element upon axial movement of the spool, the first control element and the second control element defining, when the spool is in the neutral position, a restricted pilot flow path along the pilot flow passage including a restriction, the restriction varying as a function of the spool position over the range of travel such that the flow of hydraulic fluid through the pilot flow passage is variably restricted along the range of travel of the spool.

2. The pressure control valve according to claim 1, wherein the restriction comprises a first restriction, and the pilot flow passage includes a second restriction in serial relationship with the first restriction.

3. The pressure control valve according to claim 2, wherein the second restriction comprises a fixed restriction configured to restrict flow of hydraulic fluid through the pilot flow passage irrespective of the spool position over the range of travel.

4. The pressure control valve according to claim 1, wherein the restriction comprises an orifice, the first control element and the second control element are in a first position with respect to each other and cooperate together to define the orifice therebetween when the spool is in the neutral position, and the first control element and the second control element are in a second position with respect to each other such that a clearance is defined therebetween when the spool is in the shifted position, the second position being different from the first position, and the clearance being different from the orifice such that the restricted pilot flow path does not include the orifice when the spool is in the shifted position.

5. The pressure control valve according to claim 4, wherein the orifice comprises a first orifice, and the pilot flow passage includes a second orifice in serial relationship with the first orifice, the first orifice having a cross-sectional area equal to or less than the cross-sectional area of the second orifice when the spool is in the neutral position.

6. The pressure control valve according to claim 5, wherein one of the first control element and the second control element comprises a restriction member, the restriction member defining a through passage comprising a portion of the restricted pilot flow path including the second orifice.

7. The pressure control valve according to claim 4, wherein one of the first control element and the second control element comprises a spherical surface and the other of the first control element and the second control element comprises a restriction member, the restriction member defining a through passage comprising a portion of the restricted pilot flow path, the spherical surface arranged with an opening of the through passage of the restriction member to define the orifice when the spool is in the neutral position.

8. The pressure control valve according to claim 4, wherein one of the first control element and the second control element comprises a pilot pin and the other of the first control element and the second control element comprises a restriction member, the restriction member defining a through passage comprising a portion of the restricted pilot flow path, the pilot pin arranged with an opening of the through passage of the restriction member to define the orifice when the spool is in the neutral position.

9. The pressure control valve according to claim 8, wherein the pilot pin includes a conical distal end, and the opening of the through passage of the restriction member includes an offset hole, the conical distal end of the pin projecting into the portion of the restricted pilot flow path defined by the restriction member and cooperating with the offset hole to define the orifice when the spool is in the neutral position.

10. The pressure control valve according to claim 8, wherein the pilot pin includes a cylindrical distal end, and the through passage of the restriction member includes a counterbore including the opening, the cylindrical distal end of the pin extending through the counterbore into the through passage of the restriction member and cooperating therewith to define the orifice when the spool is in the neutral position.

11. The pressure control valve according to claim 8, wherein the pilot pin includes a conical distal end defining an intermediate notch, the conical distal end of the pin projecting into the portion of the restricted pilot flow path defined by the restriction member such that the intermediate notch of the pilot pin cooperates with the opening of the restriction member to define the orifice when the spool is in the neutral position.

12. The pressure control valve according to claim 8, wherein the pilot pin includes a tapered distal end, the tapered distal end of the pin extending into the through passage of the restriction member and cooperating therewith to define the orifice when the spool is in the neutral position.

13. The pressure control valve according to claim 4, wherein the pilot pin includes a base defining a groove and a cylindrical distal end projecting from the base, and the restriction member includes a tapered countersink surface circumscribing the opening, the cylindrical distal end of the pin extending through the opening into the through passage of the restriction member and the groove of the pilot pin cooperating with the tapered countersink surface to define the orifice when the spool is in the neutral position.

14. The pressure control valve according to claim 1, wherein one of the first control element and the second control element comprises a pilot pin and the other of the first control element and the second control element comprises a restriction member, the restriction member defining a through passage comprising a portion of the restricted pilot flow path and an opening to the through passage, the pilot pin arranged with the opening of the through passage of the restriction member, the pilot pin includes a base comprising a porous material and a cylindrical distal end projecting from the base, and the restriction member includes a tapered countersink surface circumscribing the opening, the cylindrical distal end of the pin extending through the opening into the through passage of the restriction member and the base of the pilot pin cooperating with the tapered countersink surface to define the restriction through the base when the spool is in the neutral position.

15. The pressure control valve according to claim 1, wherein one of the first control element and the second control element comprises a pilot pin and the other of the first control element and the second control element comprises a restriction member, the restriction member defining a through passage comprising a portion of the restricted pilot flow path and an opening to the through passage, the pilot pin arranged with the opening of the through passage of the restriction member, the pilot pin includes a base including a first textured mating surface and a cylindrical distal end projecting from the base, and the restriction member includes a second textured mating surface and a tapered countersink surface circumscribing the opening, the cylindrical distal end of the pin extending through the opening into the through passage of the restriction member and the first textured mating surface of the pilot pin cooperating with the second textured mating surface of the restriction member to define the restriction when the spool is in the neutral position.

16. The pressure control valve according to claim 1, wherein the spool includes a tank land, and the body includes a cage, the cage defining an axial communication passage portion of the pilot flow passage and a cross-hole in communication with the axial communication passage portion, the first control element comprising the tank land of the spool, and the second control element comprising the cage of the body, the tank land and the cage defining the restriction therebetween, the restriction comprising an annular clearance gap between the cage and the tank land of the spool.

17. The pressure control valve according to claim 16, wherein the tank land defines a recess, the recess in axial alignment with the cross-hole of the cage when the spool is in the neutral position, and wherein the tank land is axially offset from the cross-hole when the spool is in the shifted position.

18. The pressure control valve according to claim 1, wherein the range of travel of the spool includes at least one intermediate position between the neutral position and the shifted position in which the work port is in fluid communication with both the tank port and the supply port.

19. The pressure control valve according to claim 1, wherein the closure element of the pilot flow valve assembly comprises a ball, and the pilot flow valve assembly includes a seat, a push pin, and an actuator, the seat being secured to the body, the seat including a first end and a second end and defining a through passage comprising a portion of the pilot flow passage and extending from the first end to the second end, the ball adjacent the first end of the seat, one of the first control element and the second control element secured to the seat adjacent the second end thereof, the push pin engaged with the ball, the actuator mounted to the body, the actuator arranged with the push pin and configured to selectively move the push pin to thereby seat the ball against the seat to occlude the through passage of the seat.

20. The pressure control valve according to claim 19, wherein the actuator comprises a solenoid assembly including a coil, an armature, and a pole piece, the coil mounted to the body and disposed around the armature, and the armature disposed within the axial bore of the body, the armature being configured to move toward the pole piece in response to an electrical current being applied to the coil, the armature being arranged with the push pin such that the movement of the armature toward the pole piece moves the push pin to thereby move the ball into sealing arrangement with the seat.

21. The pressure control valve according to claim 1, further comprising:
 a plug, the plug disposed within the axial bore of the body and secured thereto at a distal end thereof to occlude the axial bore;
 wherein the plug and the spool cooperate with the body to define a spring chamber within the axial bore, the biasing element disposed within the spring chamber;
 wherein the spool defines a damping flow passage having a damping orifice therein, the work port and the spring chamber being in fluid communication with each other via the damping flow passage.

22. The pressure control valve according to claim 21, wherein the closure element of the pilot flow valve assembly comprises a ball, and the pilot flow valve assembly includes a seat, a push pin, and an actuator, the seat being secured to the body, the seat including a first end and a second end and defining a through passage comprising a portion of the pilot flow passage and extending from the first end to the second end, the ball adjacent the first end of the seat, one of the first control element and the second control element secured to the seat adjacent the second end thereof, the push pin engaged with the ball, the actuator mounted to the body, the actuator arranged with the push pin and configured to selectively move the push pin to thereby seat the ball against the seat to occlude the through passage of the seat, and wherein the first control element and the second control element are in a first position with respect to each other and cooperate together to define the restriction therebetween when the spool is in the neutral position, and the first control element and the second control element are in a second position with respect to each other such that a clearance is defined therebetween when the spool is in the shifted position, the second position being different from the first position, and the clearance being different from the restriction such that the restricted pilot flow path does not include the restriction when the spool is in the shifted position.

23. The pressure control valve according to claim 1, wherein the body includes an interior bore surface and defines the pilot flow passage and a pilot cross bore in fluid communication with the pilot flow passage and open to the interior bore surface, the spool includes a pilot land, the pilot land of the spool and the interior bore surface of the body defining the restriction.

24. The pressure control valve according to claim 23, wherein the pilot land is disposed axially between the pilot cross bore and the first control element when the spool is in the neutral position, and the pilot cross bore is disposed axially between the pilot land and the first control element when the spool is in the shifted position.

25. The pressure control valve according to claim 23, wherein the spool includes an exterior surface, the exterior surface of the spool defining an exterior groove, the exterior groove of the spool in axial alignment with the pilot cross bore when the spool is in the neutral position.

26. The pressure control valve according to claim 1, wherein the body defines the pilot flow passage and includes an interior bore surface defining an interior groove, the interior groove in fluid communication with the pilot flow passage and open to the interior bore surface, the spool includes a pilot land, the pilot land of the spool and the interior bore surface of the body defining the restriction.

27. The pressure control valve according to claim 26, wherein the pilot land is disposed axially between the interior groove of the body and the first control element when the spool is in the neutral position, and the interior groove of the body is disposed axially between the pilot land and the first control element when the spool is in the shifted position.

28. A hydraulic control system comprising:
   a pump, the pump adapted to provide a source of pressurized fluid;
   a tank, the tank adapted to hold a reservoir of fluid, the tank in fluid communication with the pump;
   an actuator, the actuator in selective fluid communication with the pump, the actuator defining a chamber therein adapted to receive pressurized fluid;
   a pressure control valve, the pressure control valve in fluid communication with the pump, the tank, and the actuator with the pressure control valve interposed between the pump and the actuator and between the actuator and the tank, the pressure control valve including:
      a body, the body defining an axial bore, a supply port, a work port, and a tank port, each of the supply port, the work port, and the tank port being in fluid communication with the axial bore, the supply port being in fluid communication with the pump, the work port being in fluid communication with the chamber of the actuator, the tank port being in fluid communication with the tank,
      a spool, the spool being disposed within the axial bore of the body and axially movable over a range of travel between (i) a neutral position, in which the supply port and the work port are in fluid isolation from each other and the work port and the tank port are in fluid communication with each other to thereby fluidly connect the chamber of the actuator to the tank, and (ii) a shifted position, in which the supply port and the work port are in fluid communication with each other to thereby fluidly connect the pump to the chamber of the actuator and the work port and the tank port are in fluid isolation from each other,
      at least one of the spool and the body defining a pilot flow passage, the pilot flow passage in fluid communication with the supply port and the tank port when the spool is in the neutral position,
      a biasing element, the biasing element operatively arranged with the spool to bias the spool to the neutral position,
      a pilot flow valve assembly, the pilot flow valve assembly configured to selectively occlude the pilot flow passage, the pilot flow valve assembly including a closure element movable between an open position in which the pilot flow passage is open and a closed position in which the pilot flow passage is occluded,
      a pilot flow control assembly, the pilot flow control assembly disposed in the pilot flow passage, the pilot flow control assembly including a first control element and a second control element, the first control element secured relative to the spool and the second control element secured relative to the body such that the first control element is axially movable with respect to the second control element upon axial movement of the spool, the first control element and the second control element defining, when the spool is in the neutral position, a restricted pilot flow path along the pilot flow passage including a restriction, the restriction varying as a function of the spool position over the range of travel such that the flow of hydraulic fluid through the pilot flow passage is variably restricted along the range of travel of the spool.

29. The hydraulic control system according to claim 28, wherein the actuator comprises a transmission clutch control.

30. The hydraulic control system according to claim 28, wherein the first control element and the second control element are in a first position with respect to each other and cooperate together to define the second orifice therebetween when the spool is in the neutral position, and the first control element and the second control element are in a second position with respect to each other such that a clearance is defined therebetween when the spool is in the shifted position, the second position being different from the first position, and the clearance being different from the second orifice such that the restricted pilot flow path does not include the second orifice when the spool is in the shifted position.

* * * * *